United States Patent [19]

Gordon

[11] Patent Number: 4,993,014
[45] Date of Patent: Feb. 12, 1991

[54] DYNAMIC SHARED FACILITY SYSTEM FOR PRIVATE NETWORKS

[75] Inventor: Travis H. Gordon, Madison, N.J.

[73] Assignee: AT&T Bell Laboratories, Murray Hill, N.J.

[21] Appl. No.: 359,015

[22] Filed: May 30, 1989

[51] Int. Cl.$^5$ .............................................. H04L 1/00
[52] U.S. Cl. .................................... 370/16; 370/68.1; 370/95.1
[58] Field of Search ....................... 370/16, 58.1, 58.2, 370/62, 68.1, 95.1, 110–111; 340/825.01, 827; 371/8.2

[56] References Cited

U.S. PATENT DOCUMENTS 4,348,554 9/1982 Asmuth .
4,878,048 10/1989 Gottesman et al. ............. 340/825.01
4,884,263 11/1989 Suzuki ................................... 370/16

OTHER PUBLICATIONS

Vnet, (MCI Brochure), 4/88.
Manufacturer's Brochure for The Integrated Digital Network Exchange, (IDNX) manufactured by Network Equipment Technologies, (equipment predates Apr. 1988; date of brochure unknown).
S. Horing et al., "Overview", and J. J. Lawser et al., Generic Network Plan, *Bell System Technical Journal*, vol. 61, No. 7, Part 3, Sep. 1982, pp. 1579–1598.

Primary Examiner—Douglas W. Olms
Assistant Examiner—Melvin Marcelo
Attorney, Agent, or Firm—W. Ulrich

[57] ABSTRACT

This invention relates to a dynamically shared facility network (DSFN) providing private network service to a plurality of customers using switched facilities of a common carrier network. A plurality of serving offices are connected via access links to customer telecommunications equipment. A pool of channels is dedicated to providing communications for private network service among these serving offices. In response to a request from a customer, connections are set up in the serving offices between access links and members of the pool of channels, in order to interconnect the serving links sought to be connected by the request. Where tandem connections between serving offices are necessary, connections are set up between members of the pool of channels. In case of failure of one or more channels, a new connection is automatically established. Advantageously, communication channels of the large communications facilities of a public switched network can be allocated to the DSFN, thus achieving economies of scale, and thus permitting use of the large and flexible switching systems of the public switched network to control and switch channels of the DSFN.

36 Claims, 18 Drawing Sheets

CUSTOMER A DEDICATED NETWORK

CUSTOMER B DEDICATED NETWORK

TOTAL (A+B) DEDICATED NETWORK DEMAND

CUSTOMER A SHARED NETWORK DEMAND

CUSTOMER B SHARED NETWORK DEMAND

TOTAL (A+B) SHARED NETWORK DEMAND

CUSTOMER A RELIABLE DEDICATED NETWORK

CUSTOMER B RELIABLE DEDICATED NETWORK

TOTAL (A+B) RELIABLE DEDICATED NETWORK DEMAND

CUSTOMER A RELIABLE SHARED NETWORK DEMAND

CUSTOMER B RELIABLE SHARED NETWORK DEMAND

TOTAL (A+B) RELIABLE SHARED NETWORK DEMAND

DYNAMIC SHARED FACILITY SYSTEM FOR PRIVATE NETWORKS

TECHNICAL FIELD

This invention relates to arrangements for providing telecommunication service to private customer networks.

PROBLEM

In recent years there has been a rapidly increasing demand for large private data networks to connect, for example, a large number of terminals such as reservation terminals to central host computers used for keeping track of reservation data. In addition, there has also been an increase in the voice private network services required by companies which are geographically dispersed, to handle the increasing volume of voice traffic among branch locations and between branch and headquarters locations. Private voice networks exist primarily as economically attractive alternatives to public network use. Data networks are implemented on private facility networks because prevalent host computer applications assume continuous connectivity to terminals. This characteristic makes the current public telephone network, arranged to provide transmission for many short communications, unsuitable and excessively costly for these applications.

Virtual networks, such as AT&T's Software Defined Network (SDN), set up call connections one at a time, in response to a dialed request from a caller, over the public switched network, while providing customer features, such as special in-network dialing arrangements. Such networks, whose callers compete for service with the general public, do not provide the very high availability of dedicated private networks needed, for example, for inter-computer data transfers, necessary for the orderly conduct of a business.

Increasingly, customer dedicated digital facilities such as those provided by the Accunet® T1.5 service offered by AT&T are used as the private network backbone facilities between major customer locations. A digital facility consists of an access link between the customer premises and an AT&T serving office and an interoffice link provisioned from digital carrier systems connecting AT&T offices. Multiplexers in the major customer locations are used to derive both voice and data circuits from the digital facility. Such an arrangement is illustrated in FIG. 1. Facilities are provisioned by a common carrier through static cross-connect arrangements such as the Digital Access and Cross Connect System manufactured by AT&T Technologies, in the serving office. For high bandwidth facilities such as those offered by Accunet T1.5 Service these cross-connections are manually patched between the carrier terminal equipment of digital carrier systems. In this manner a common facility is shared among applications. These networks have become more complex as more customers have become geographically diverse and as the use of point to point facilities has become less economical and is being replaced by the use of networks providing switching arrangements. Typically, private network locations are not fully interconnected by digital facilities. Then, two locations may be interconnected via one or more tandem locations, implemented through the use of private branch exchange (PBX) facilities and specialized flexible multiplexer systems, in order to use the private digital facilities efficiently. A switching or cross-connect junction is then required on the customer's premises. Efficient use of such arrangements requires individual circuits to traverse the least number of tandem pints. As these networks become more congested such routing is not always possible and over time inefficient routing develops which requires periodic administrative rearrangement.

Increasingly, customers have come to depend on these communication facilities in order to carry out their routine work so that the reliability of these network facilities has become critical. The engineering of networks and the administration of networks to provide this high reliability is complex and expensive. Further, following failures in the network and the use of backup facilities in response to these failures, restoration of these networks to the normal traffic carrying pattern is a complex and time consuming task. Accordingly, a problem of prior art large private customer networks is that high costs for network engineering, operations and administration are incurred in providing highly reliable service in the presence of network failures and frequently changing traffic pattern demands of the customers.

SOLUTION

The above problems are solved and an advance is made in the state of the art in accordance with the principles of this invention, wherein, illustratively, a telecommunications network comprising a plurality of switching systems and interswitch transmission facilities comprises a pool of interswitch communication channels dedicated for use by a plurality of private networks. Each private network is connected to ones of a plurality of toll switches by access facilities. These access facilities define and limit the use of interswitch channels; the private customers are allowed to set up on demand any set of interconnections among their access facilities, the interconnections being provided by the pool of channels of the network. In response to a request data message from a customer administrator of one of the private networks, any interswitch channels(s) that is currently available may be assigned for connecting the access facilities specified in the message. A data base maintains a record of use of access facilities by the private customer to ensure that the private customer does not exceed his allotted capacity. Each switch maintains a record of the trunk groups and the busy/idle status of all the channels (trunks) of the pool that are connected to that switch and maintains a routing data base for selecting an optimum route for connecting the access facilities to be connected in response to any request. The pool is engineered to provide sufficient transmission facilities to interconnect all the access facilities of the private network customers in any combination, and to provide an adequate number of extra facilities to be used in case of failure of one or more of the facilities in the pool. This permits each of the customer administrators to draw facilities from the pool without exhausting the pool and without requiring permission from a network administrator.

In accordance with one aspect of the invention, a shared public network also used for public telecommunications service is used to provide facilities for such a dynamically shared facility network (DSFN). Advantageously, communications channels of the large communications facilities of the public switched network can be allocated to the DSFN, thus achieving economies of scale. Advantageously, the large and flexible toll switching systems of the public switched network can be configured to control and switch the channels of the DSFN. Advantageously, such sharing eliminates the need for tandem points in customer premises equipment of the private networks. Advantageously, the network can be used to switch communication channels at switching pints in the network to allow the customer to redirect or reallocate subscribed capacity among the customer's various private network locations so that capacity may be used most advantageously. This is accomplished by selecting different channels from the dedicated pool to be used for handling that customer's most immediate traffic needs.

The DSFN is engineered so that the prespecified peak demands of all the private customer networks can be met simultaneously at any point in time. This engineering is based on limiting the access of each access point of each private customer network and limiting the set of such access points which may communicate for each private customer network. This arrangement differs from the current public switched network in that demand is unconstrained and the network is provisioned to carry a forecasted peak demand and is partially idle during off peak hours. The engineered pool is augmented by physically diverse facilities and adequate additional capacity sufficient to allow for the restoral of normal service in the event of failure of part of the regular facilities. When a failure occurs in the facility carrying channels which have been assigned to a particular private network, the failure may be detected in the customer's equipment; a request message is then automatically sent to the DSFN to reassign traffic on those channels to other available facilities. When the DSFN uses elements of a public network such as toll switches, the control of the public network can be used to control this function also. Advantageously, the fraction of additional communications channels which must be provided to assure the required level of reliability is lower in a DSFN than in a group of disjoint private networks. Advantageously, in such a DSFN, when repaired facilities are restored to service, their communications channels are automatically made available in the pool of facilities for use by other private networks by making these channels available in the data tables of the switches. This is made possible because the pool of facilities of a DSFN are subject to an overall flexible repair and administration scheme which makes a restored facility immediately available for carrying new traffic.

The invention provides for the administration of private networks as part of the overall process of administering the shared public network. Such administration takes advantage of the economies of scale offered by the large administrative systems that are present in shared public networks. Indeed, this reduces administration costs for such private networks.

The public switched network illustratively provides a CCITT standard Integrated Services Digital Network (ISDN) interface for communicating with customer access equipment. Such an arrangement permits a wide range of customer equipment to interface in a standard way with the DSFN. It also provides out-of-band signaling to provide the command and control signaling allowing the communications channels to be combined into variable transmission rate groups and allowing reestablishment of failed channels.

The invention enables two or more private networks to share units of capacity such as a 24 channel T digital carrier facility and resultingly to increase utilization of interoffice facilities.

A feature of the invention is that a customer administrator of a private network initiates a change of facilities to respond to changes in the traffic pattern of a private network by means of the aforementioned signals from the private network. Accordingly, the private network is immediately reconfigured to meet this request, without requiring intermediate processing of service orders by the public network administrator.

It is a feature of the invention that failures of facilities transporting customer channels are signaled via the aforementioned standard out-of-band signaling channel to customer access equipment. In response the customer access equipment signals for a reconnection which is routed by the network switch over a diverse network facility with redundant capacity.

Illustratively, each private network customer has access to the public switched network via dedicated access facilities. Connections within the customer's private network provided according to this invention are established only between these dedicated access facilities. These dedicated access facilities therefore define the scope of the private network assigned to that customer. These constraints define the required traffic capacity of the shared pool of facilities and permit the shared pool to be properly provisioned. As a result, customer administrators are free to request facilities, without causing an overload of the constraints, i.e., the dedicated access facilities, without causing an overload of the shared pool; effectively, if a private network administrator legitimately requests more capacity for one route, capacity of other routes is diminished.

In accordance with one aspect of the invention, a customer service controller is used for interfacing between the customer equipment and the network. The controller detects failures in the communication channels of a path and automatically sends a message to the network to request the establishment of an alternate path. The controller also maintains a record of the status of the customer's network configuration. In a preferred embodiment, the controller signals to the network over a Primary Rate Interface (PRI) of an Integrated Services Digital Network (ISDN) connection to the network.

Therefore, in accordance with the principles of this invention, a pool of transmission channels interconnecting a plurality of switching systems is dedicated for use by a plurality of private networks which request connections between their access facilities to the switching systems by sending a request message to one of the switching systems which responds to this message by causing the requested connection to be established using channels selected from the dedicated pool.

DETAILED DESCRIPTION

Figure 1:
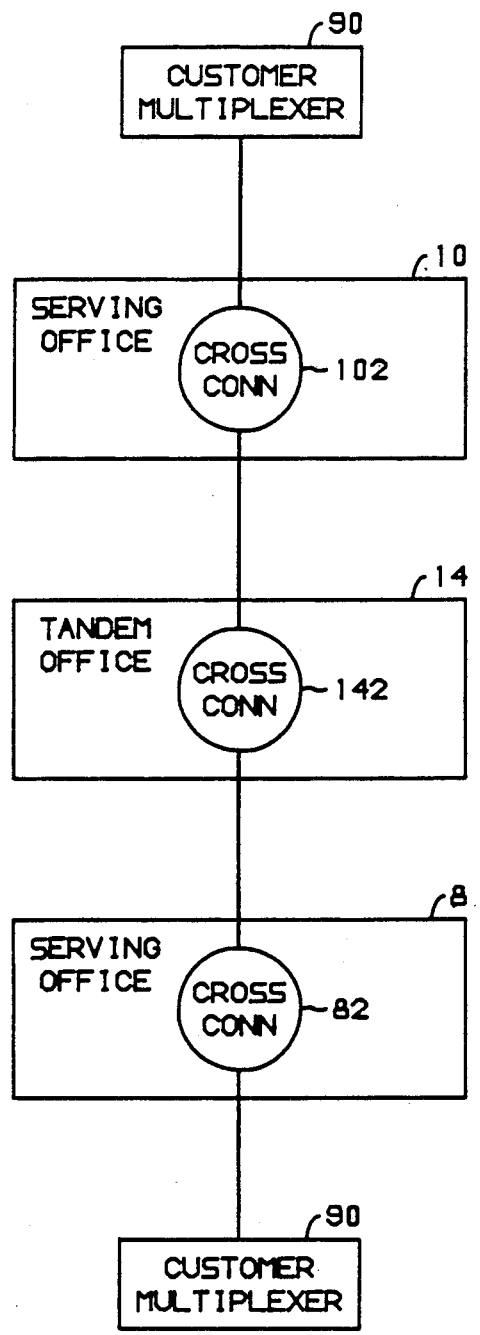
FIG. 1 is a block diagram of prior art private network arrangements.

FIG. 1 is an illustration of the prior art. Customer multiplexers 90, located on customer premises are connected via carrie systems to serving offices 10 and 8. These serving offices comprise cross-connects 102 and 82 respectively, for connecting individual trunks from one carrier system to another carrier system that interconnects the serving offices to an intermediate tandem office 14. The tandem office also comprises a cross connect 142 for interconnecting trunks terminating on the tandem office. More generally, serving offices may be interconnected through a plurality of tandem offices, through other serving offices or directly, in all cases via a cross-connect facility.

Figure 2:
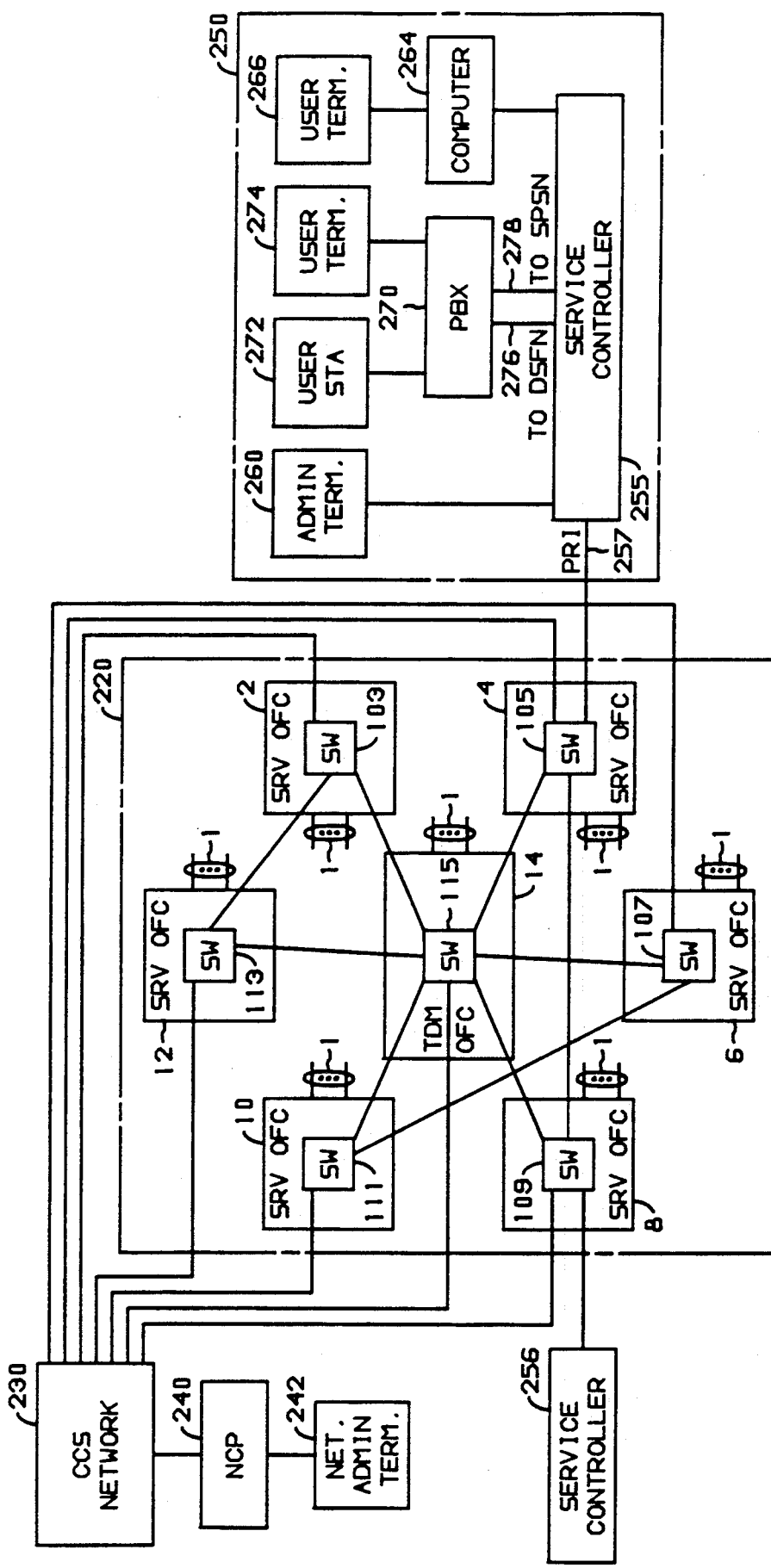
FIG. 2 is a block diagram of private network arrangements conforming to the principles of this invention.

FIG. 2 is an overall block diagram illustrating one embodiment of the invention. A transmission network 220 comprising 7 serving offices, 2, 4, 6, 8, 10, 12 and 14 is used for interconnecting the private service customers. In this embodiment, the 7 serving offices are toll switches such as the 4 ESS½ switches described in The Bell System Technical Journal, Vol. 56, No. 7, September 1977, pages 1015–1320, and comprise switching networks for setting up temporary or long term connections and facilities switching arrangements for taking incoming groups of channels and routing them to outgoing groups of channels. The 6 serving offices on the periphery, offices 2, 4, 6, 8, 10, and 12 are each connected to one other peripheral serving office and are each connected to the central serving office 14. Each of the 7 serving offices, 2, 4, 6,8, 10, 12 and 14 is also connected to a common channel signaling network 230 which is used to pass signaling information among these switches and which is used for accessing a data base called a Network Control Point (NCP) 240. Each of the serving offices also has additional channels 1 for connecting to other serving offices; these other channels together with the connections shown form the pool of channels dedicated for providing service to a plurality of private service customers. The Network Control Point 240 is used for translating signaling information into network physical addressing for routing and is used in conjunction with restricted access to the pool of channels to ensure that individual private networks do not exceed their assigned capacity. Connected to the NCP 240, is a service administrator's terminal 242 used for administration of the customer specific data relating to network 220 in the NCP 240, and for assigning channels to the dedicated pool.

In this embodiment, the shared facilities are derived from carrier systems common to the public telephone network but carry only connections originated from private network users who subscribe to the DSFN. Public telephone traffic is carried on separate trunking facilities. This assignment along with the demand restricted by the access facilities assures a level of availability comparable to that of dedicated facilities which is unaffected by unusual public telephone network demand. In an alternative embodiment of the invention, advanced routing algorithms can be used which allow the facilities to be further shared with public telephone traffic. Such algorithms logically reserve channels on the shared trunking for each service and allow priority, for example, to DSFN when overload conditions develop. Such routing schemes create further economies of scale in sharing but may have different performance characteristics.

Block 250 illustrate a typical private network user connection to network 220. The interface between the shared transmission network 220 and the private customer is a service controller 255 connected to a serving office 12 by a facility operating under the protocol of an Integrated Services Digital Network (ISDN) Primary Rate Interface (PRI) 257. This PRI comprises 23 B-channels, each 64-Kilobit per second (Kb/s), for carrying voice or data communications, and one 64 Kb/s D-channel for carrying signaling information. The service controller 255 is connected to an administrative terminal 260 for administering the private network by, for example, entering the network address of end points to be connected to receiving status information concerning end points. Since much of the traffic carried on these private networks is data traffic, a connection is shown from the service controller to a computer 264. A user terminal such as terminal 274, but at another customer location connected to another serving office, is connected via the network 220 to computer 264. The voice and switched data traffic of the private network is transmitted via connection 276 between the service controller 55 and private branch exchange (PBX) 270. A second connection via link 278 connects the service controller to the private branch exchange for serving public switched network traffic from PBX 270. This connection may share the access facility to the serving office 4 for the purpose of placing calls on the public network. The PBX is connected to user station 272 and user terminal 274.

Service controller 255 is a unit, such as the Acculink ® Model 740 of AT&T Information Systems, which can readily be adapted to perform the following functions:

(1) Terminate and monitor the individual network access transmission channels 257.

(2) Implement the PRI signaling protocol in order to interface with the signaling required to establish and control connections from serving office 4.

(3) Implement facilities to maintain the identity of allowable destinations and allowable associated bandwidth for each of these destinations so that no attempt will be made to use channels in excess of those allocated for the private customer network. Such an attempt would be block by the network 220.

(4) Implement transmission interfaces, including less than T1.5 rate, to other customer premises equipment to allow for switching or multiplexing onto established connections.

(5) Monitor the PRI signaling protocol for connection failures. Reestablish any failed connections via PRI call setup procedures. These are specified by Consultative Committee on International Telephone and Telegraph (CCITT) standards for the ISDN PRI.

(6) Implement service controller-to-service controller communications, e.g., via the PRI end-to-end signaling connection.

(7) Analyze and report diagnostic data obtained via PRI signaling and report such data to administrative terminal 60. These functions are described in detail with respect to FIG. 18.

The PRI is described, for example, in "AT&T Integrated Services Digital Network (ISDN) Primary Rate-Interface Specification", AT&T Document TR 41449, March 1986, and in the CCITT Red Book, Vol. 3, Fascicle 3.5, Series I, ISDN Recommendations, Geneva, 1985.

FIGS. 3-17 illustrate how a network such s the one described with respect to FIG. 2, can be used to provide private service economically. A number of problems are solved by these arrangements. The problems include the following:

(1) In prior art private networks, the use of a cross connect system to provide customers with a fraction of a carrier facility isolates the customer access equipment from existing methods of detecting facility failures. The use of the shared private network arrangement permits customers to use only a fraction of a transmission facility (e.g., 6 channels of a T-carrier facility) while receiving failure messages via the out-of-band signaling channel.

(2) For many private networks, it is necessary to provide redundancy so that in case of a failure, the private customer's operation is not shut down. In many cases, the provision of an alternative route under the prior art arrangements, requires transmitting data over long multi-link connections while in a shared network, could be used much more efficiently.

(3) In prior art private networks, it is inefficient to provide a customer with a fraction of a carrier facility because it is difficult to arrange that several private customers share a particular facility, especially under circumstances where redundant facilities are required. The use of a shared private network arrangement permits customers to use only a fraction of a transmission facility (e.g. 6 channels of a 24-channel T-carrier facility).

(4) In a switchable private network arrangement, switches can be used to reconfigure a particular private customer's network in response to changes of demand, thus, avoiding a requirement of providing facilities of capacity sufficient for all different demands of one customer, or, alternatively, to reprovision capacity by manually changing cross sections within the carrier network.

(5) In a shared private network, it is possible to share redundant facilities thus providing better performance int he face of trouble with lower facilities expense. For example, if a customer needs one facility and purchases two in order to have redundancy, that customer could receive better service in the face of trouble if he shared ten facilities with other customers who had an aggregate demand of seven facilities.

(6) It is desirable to provide redundant facilities using geographically diverse route so that a common trouble source such as a cable break does not remove from service a facility and its redundant facility. A shared private network arrangement provides a much larger amount of geographical diversity for redundant routes than is economical in a dedicated private network.

Figure 3:
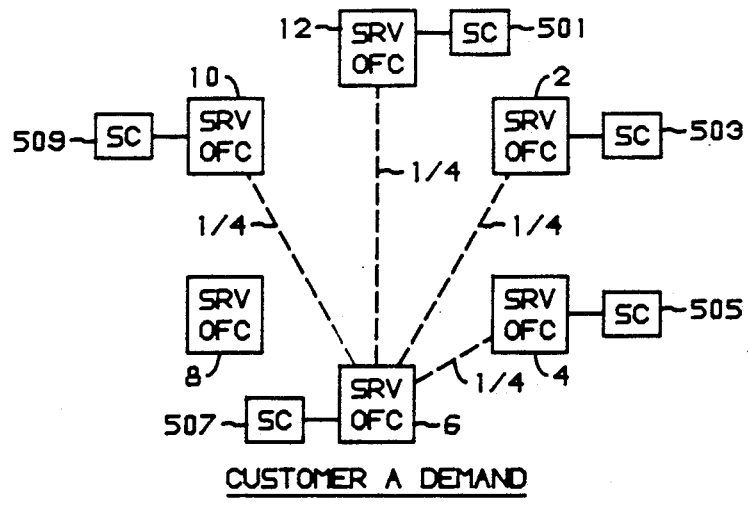
FIGS. 3–5 are examples of separate and total network demands of two private customers.

FIG. 3 illustrates the traffic demand of customer A. The units are in fractions of a T-carrier facility so that one quarter corresponds to six channels of 64 kilobits per second each or 384 kilobits per second. Customer A's network consists of terminations on serving offices 10, 12, 2, 4 and 6. All of the demand by customer A is for connections between customer A's equipment connected to switch 6 and the equipment connected to serving offices 10, 12, 2 and 4. There is no demand for traffic among the stations terminated at serving offices 10, 12, 2 and 4. The traffic demand is for one quarter unit from each of the serving offices 10, 12, 2 and 4 to switch 6.

Figure 4:
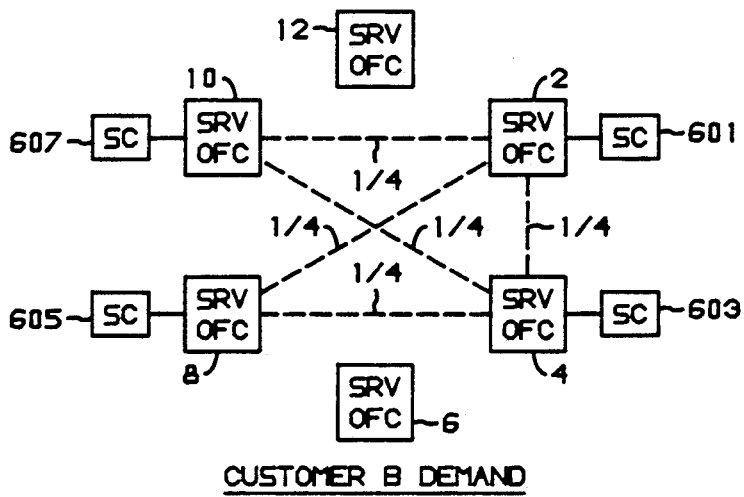

FIG. 4 illustrates the demand of customer B. Customer B is connected to serving offices 2, 4, 8, and 10 and the typical demand is for a quarter unit of traffic between 2 and 10, 2 and 4, 2 and 8, and 4 and 10. The maximum demand generated at the connections to serving offices 2 and 4 is three quarters of a unit each and the maximum demand generated at the connections to serving offices 8 and 10 is one half unit each.

Figure 5:
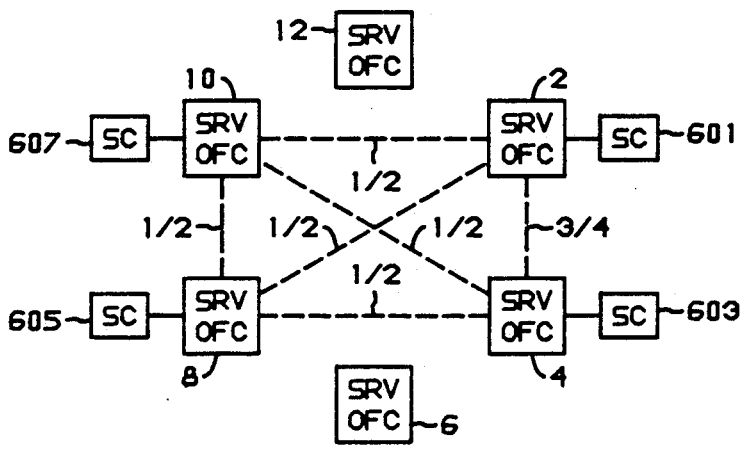

FIG. 5 illustrates alterative demands of customer B. The alterative demands are that serving offices 2 and 4 can generate or terminate up to three quarters of a unit of demand each and serving offices 10 and 8 can generate up to half a unit of demand each and that any interconnection within this restrain is allowed.

The actual physical network i shown within block 20 of FIG. 2. It comprises a star wherein serving offices 2, 4, 6, 8, 10 and 12 are connected to central serving office 15 and in addition, there are facilities between serving offices 12 and 2; 4 and 8; and 6 and 10. Thus, each of the peripheral serving offices 2, 4, 6, 8, 10 and 12 have two geographically and physically diverse output links and serving office 14 has such links.

Figure 6:
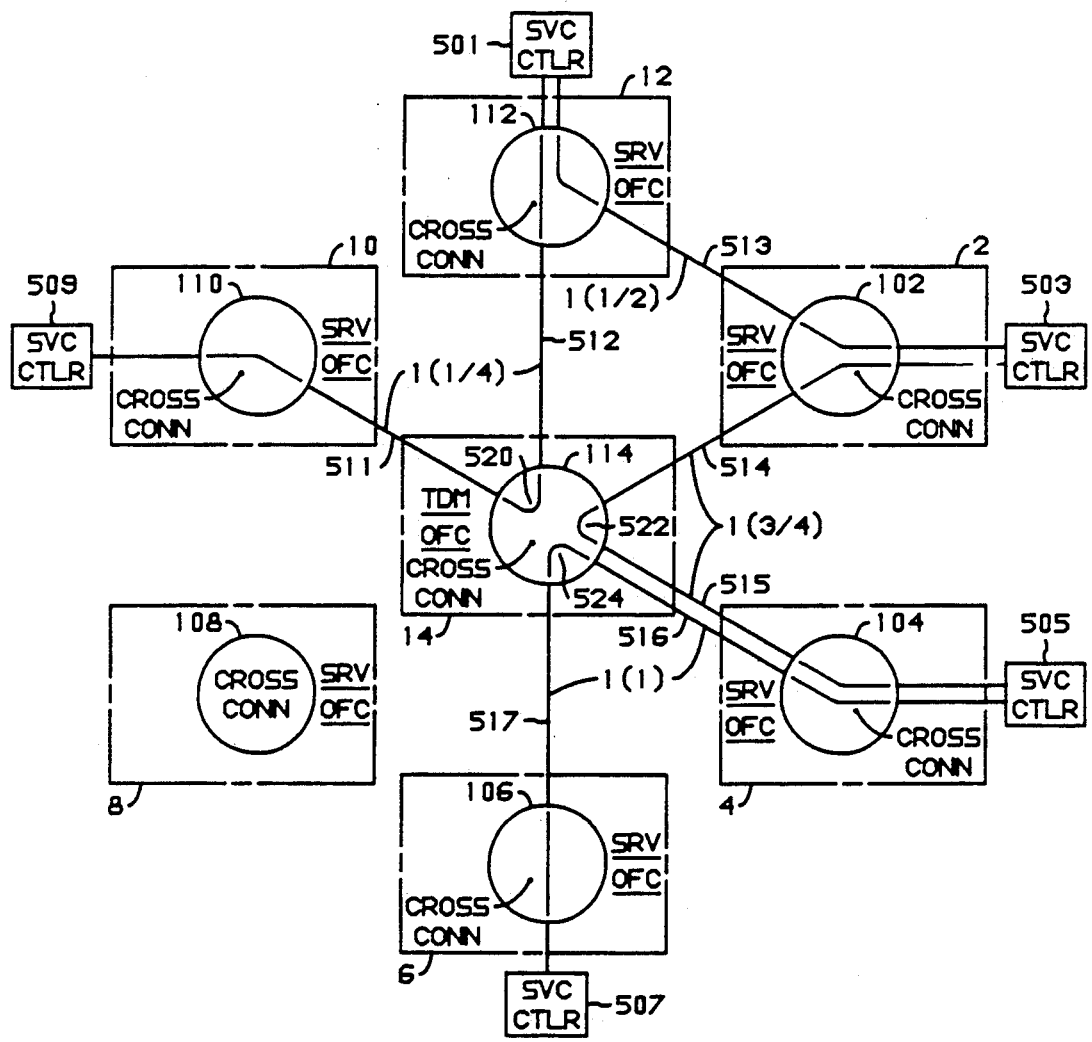
FIGS. 6–17 illustrate the advantage of using shared as opposed to dedicated networks.

FIG. 6 illustrates a dedicated private network for customer A having no redundancy. For the dedicated networks, each serving office has a cross-connect facility for establishing the connections required for the private networks. Blocks 501, 503, 505, 507 and 509 represent the interface equipment such as service controller 255 connected to a cross-connect facility in one of the serving offices. Blocks 509 and 507 are represented as being connected to serving offices 6 and 10 by a single line to indicate the fact that no tandem switching takes place at these interfaces. A double line is shown connecting blocks 501, 503, 505 to serving offices 12, 2, 4 to indicate that the interface of these three serving offices performs a tandeming function, that is, a function of switching incoming circuit demand directly to outgoing facilities as well a performing the function of connecting locally generated demand to the network. For example, interface 501 switches the demand from interface 509 directly to interface 503, in addition to adding its own demand to that headed for that interface. In contrast, the tandeming function is performed at the switching network within serving offices int he shared networks of this description. Because, in a dedicated network the facilities may not be shared among the different private customers, each of the links 511, 512, 513, 514, 515, 516, and 517 is adequate for carrying a full unit of traffic though the requirements indicated in parentheses for each of these links varies from one quarter (links 511 and 512) to one half (link 513) to three quarters (links 514 and 515) to one (links 516 and 517). Those links interconnecting two serving offices which are not directly connected in the transmission network 20, such as serving offices 10 and 12, are shown as two separate links 511 and 512 connected by a permanent connection 520 within serving office 14. Similarly, links 514 and 515 interconnecting serving offices 2 and 4 are connected by a permanent connection 522 and links 516 and 517 interconnecting serving offices 4 and 6 are connected by a permanent connection 524 within serving office 14. Notice that in order to meet customer A's demand using a dedicated network, a total of seven links are required to provide nonredundant service.

Figure 7:
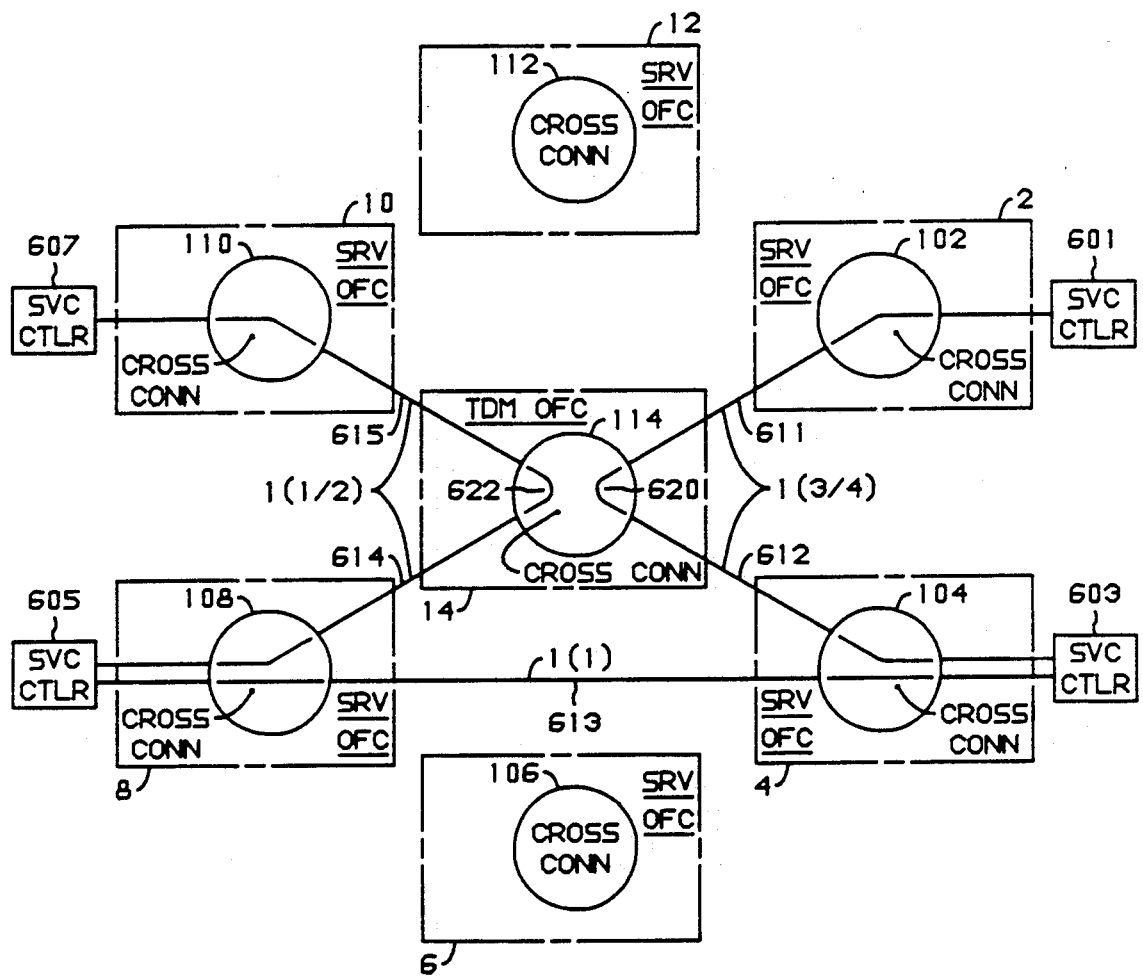

FIG. 7 illustrates a dedicated network which can meet the demands of customer B. Interface equipment 601, 603, 605, and 607, each comprising a service controller 255 on serving offices 2, 4, 8, and 10 are used by customer B for interfacing with the dedicated network. Links 611 and 612 which are connected by connection 620 in serving office 14 interconnect customer B terminations on serving offices 2 and 4. Interface 603 provides a tandeming function to switch demand from he interface 601 to interfaces 605 and 607, as well as to interface 603. Link 613 interconnects serving offices 4 and 8 directly and links 614 and 615 connected via connection 622 within switch 14 interconnect interfaces 605 and 607. Interface 605 also provides a tandeming function to switch demand from interface 607 to interfaces 603 or 601 as well as to termination 605. While only full facilities are used for each of the links, the maximum demand traffic required on each of these links is a full unit for link 613; three quarters of a unit for links 611 and 612; ad one half unit for links 614 and 615. The total number of links required to serve customer B using a dedicated network without redundancy is five.

Figure 8:
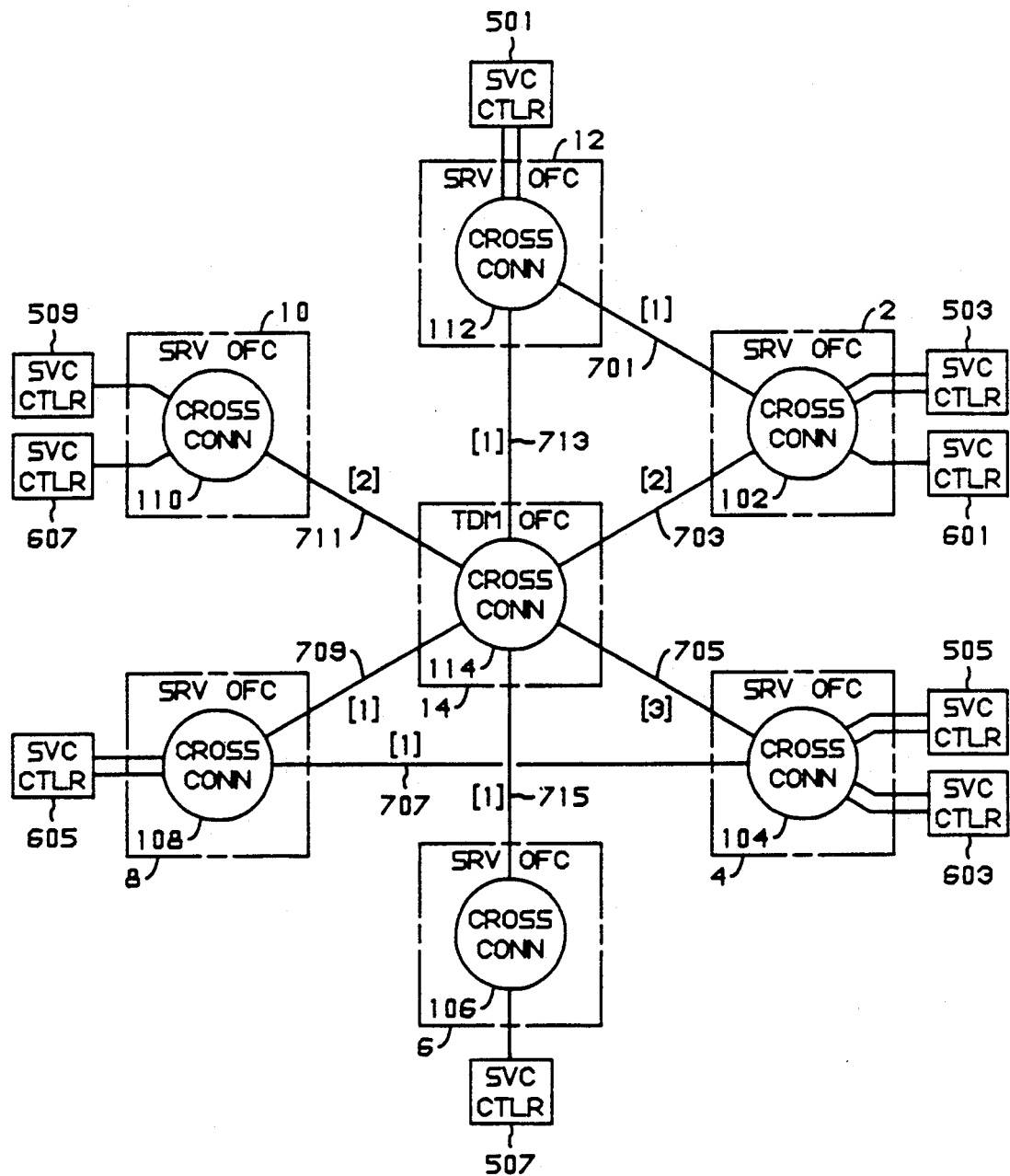

FIG. 8 is a superposition of FIGS. 6 and 7 and indicates that to meet the total demand for the private networks of customers A and B using dedicated facilities requires 12 links: one unit of traffic over route 701 between serving offices 12 and 2; two units of traffic over the route 703 between serving offices 2 and 14; three units of traffic over route 705 connecting service offices 14 and 4; one unit of traffic over route 707 connecting serving offices 4 and 8; one unit of traffic over route 709 connecting serving offices 8 and 14; two units of traffic over route 711 connecting serving offices 10 and 14; one unit of traffic over route 713 connecting serving offices 12 and 14; and one unit of traffic over route 715 connecting serving offices 6 and 14.

Figure 9:
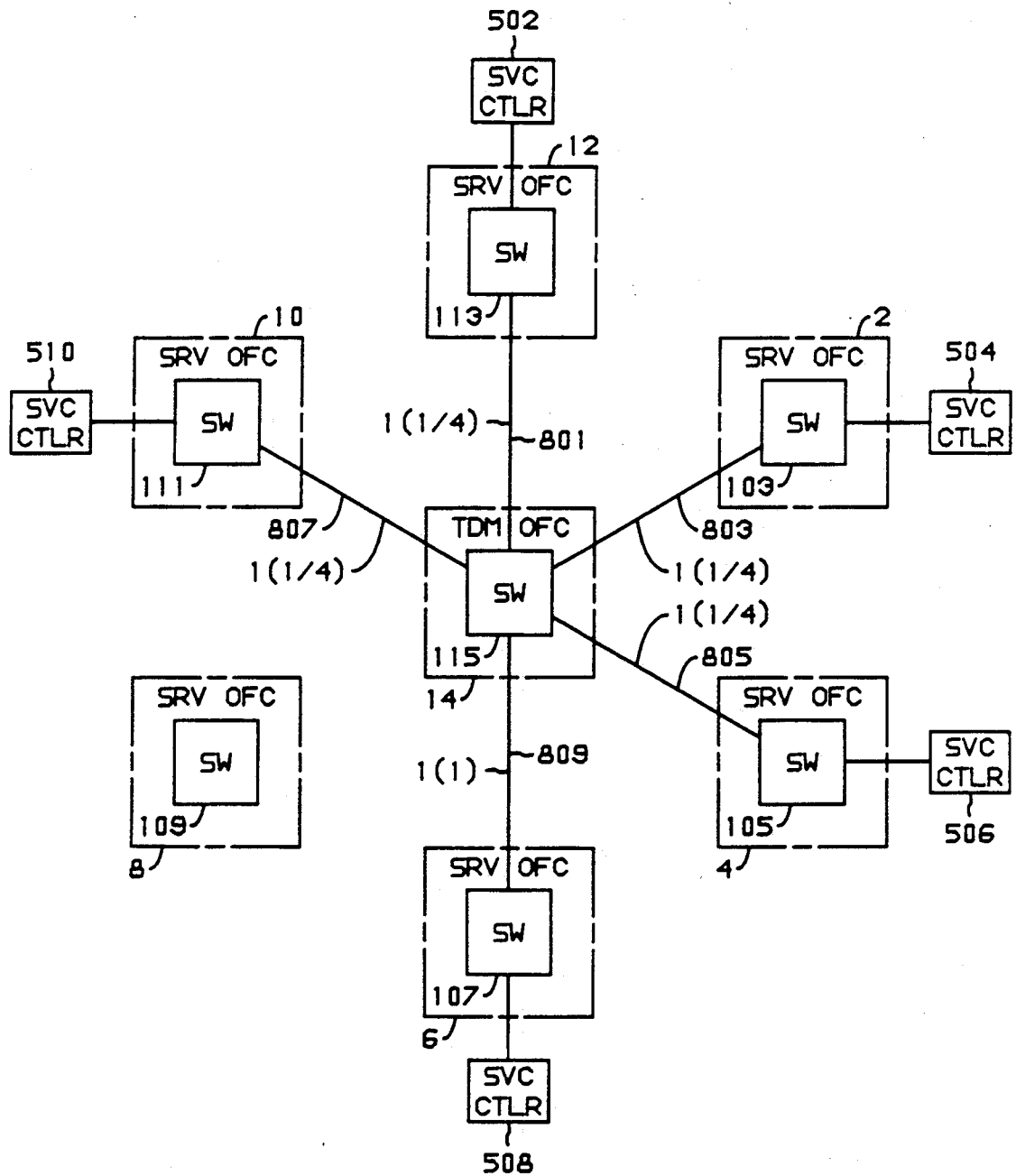
Figure 10:
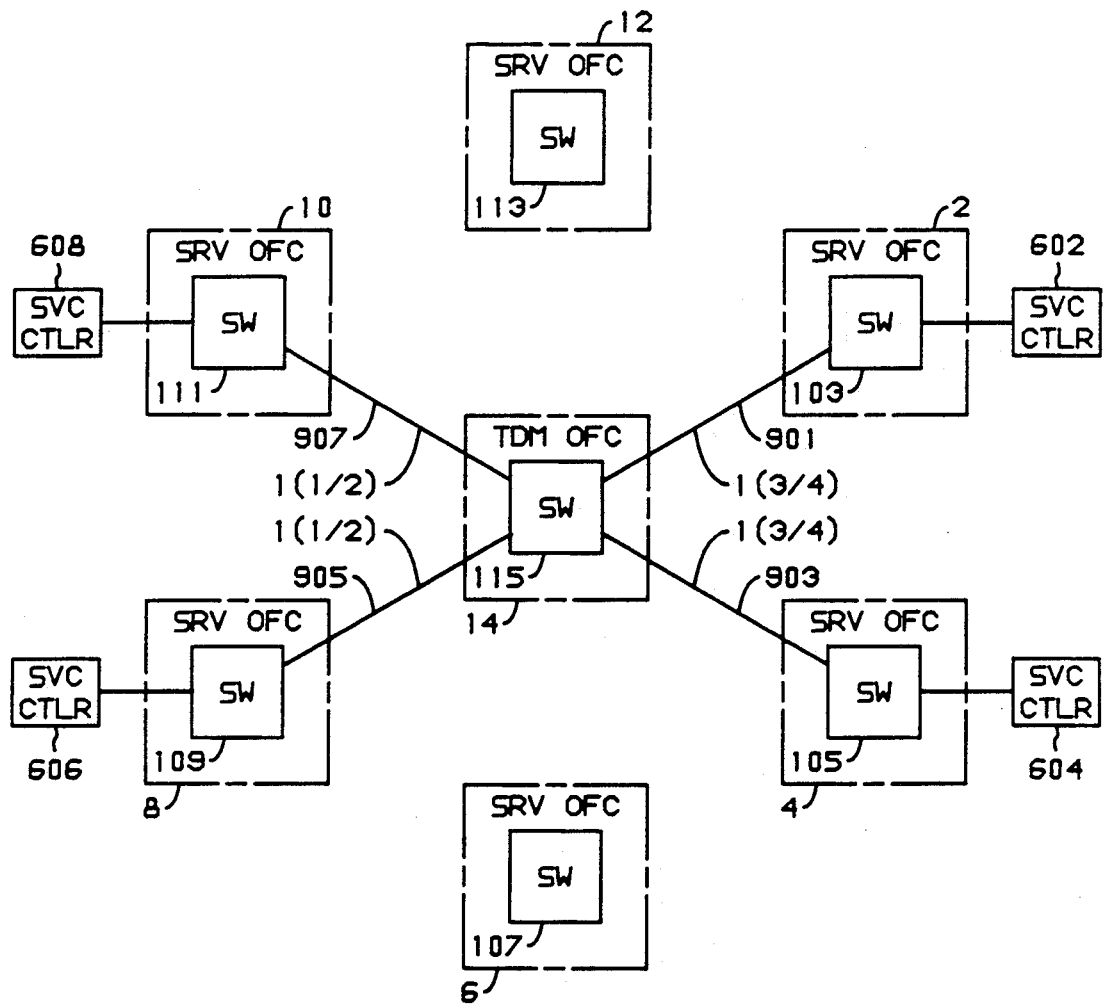
Figure 11:
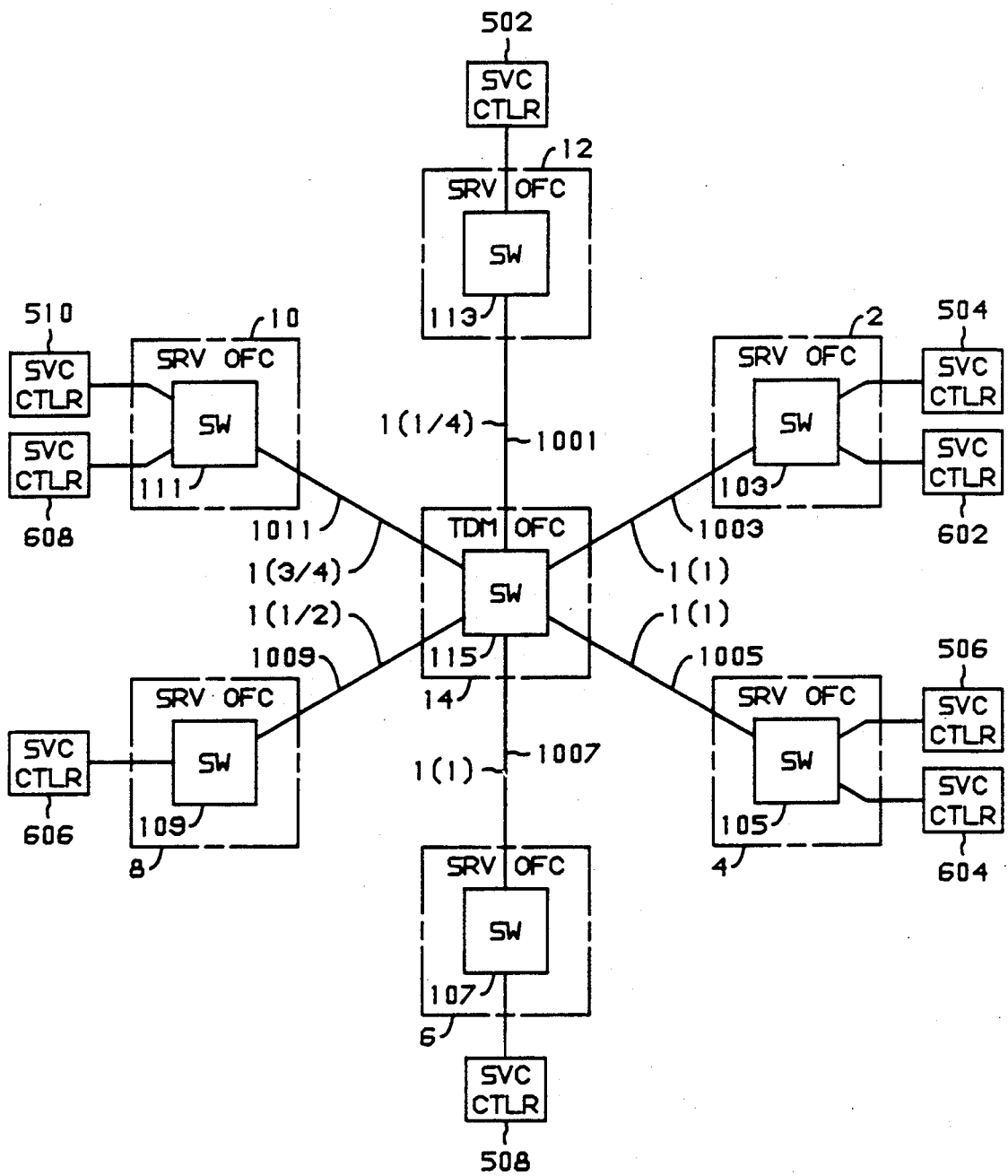

In the configurations of FIGS. 9–11, switching is performed at each serving office and partial units of traffic can be merged onto a full unit of traffic using this switching capability. The interfaces at the customer premises comprise units 255, and the interfaces are shown as blocks 502, 504, 506, 508 and 510 for customer A, and as blocks 602, 604, 606 nd 608 for customer B. In FIG. 9, customer A's demands can be met using routes 801, 803, 805, and 807 joining serving offices 12, 2, 4, and 10, respectively, to serving office 14 and each carrying one quarter of a unit of traffic to route 809 connecting serving office 14 to serving office 6 and carrying a full unit of traffic. This requires only five links in contrast to the seven links required in FIG. 6.

FIG. 10 illustrates how customer B's demands can be met through four links over routes 901, 903, 905, and 907 carrying three quarters, three quarters, one half and one half a unit of traffic apiece. This contrasts with five links required in the configuration of FIG. 7 to carry the same traffic.

Finally, FIG. 11 illustrates that six links can carry all the traffic required by customers A and B. As can be seen from examination of FIGS. 9 and 10, a single route 1001 is all that is required to carry traffic from serving office 14 to serving office 12 for termination on unit 502; a single route carrying one unit of traffic is all that is required for connecting serving office 14 to serving office 2 for switching of that traffic to interfaces 504 and 602; a single unit of traffic is all that is required over link 1005 connecting serving office 12 and serving office 14 for switching traffic to interfaces 506 and 604; a single link carrying one unit of traffic is all that is required for route 1007 between serving offices 14 and 6; interface 508; a single ink is all that is required on route 1009 connecting serving office 14 with serving office 8 to carry one half unit of traffic to interface 606 and a single link is all that is required on route 1011 to carry three quarters of a unit of traffic switched between serving office 10 and serving office 14 for interfaces 510 and 608. This is half the number of links shown in FIG. 8 to meet the demand of customers A and B using dedicated facilities.

Figure 12:
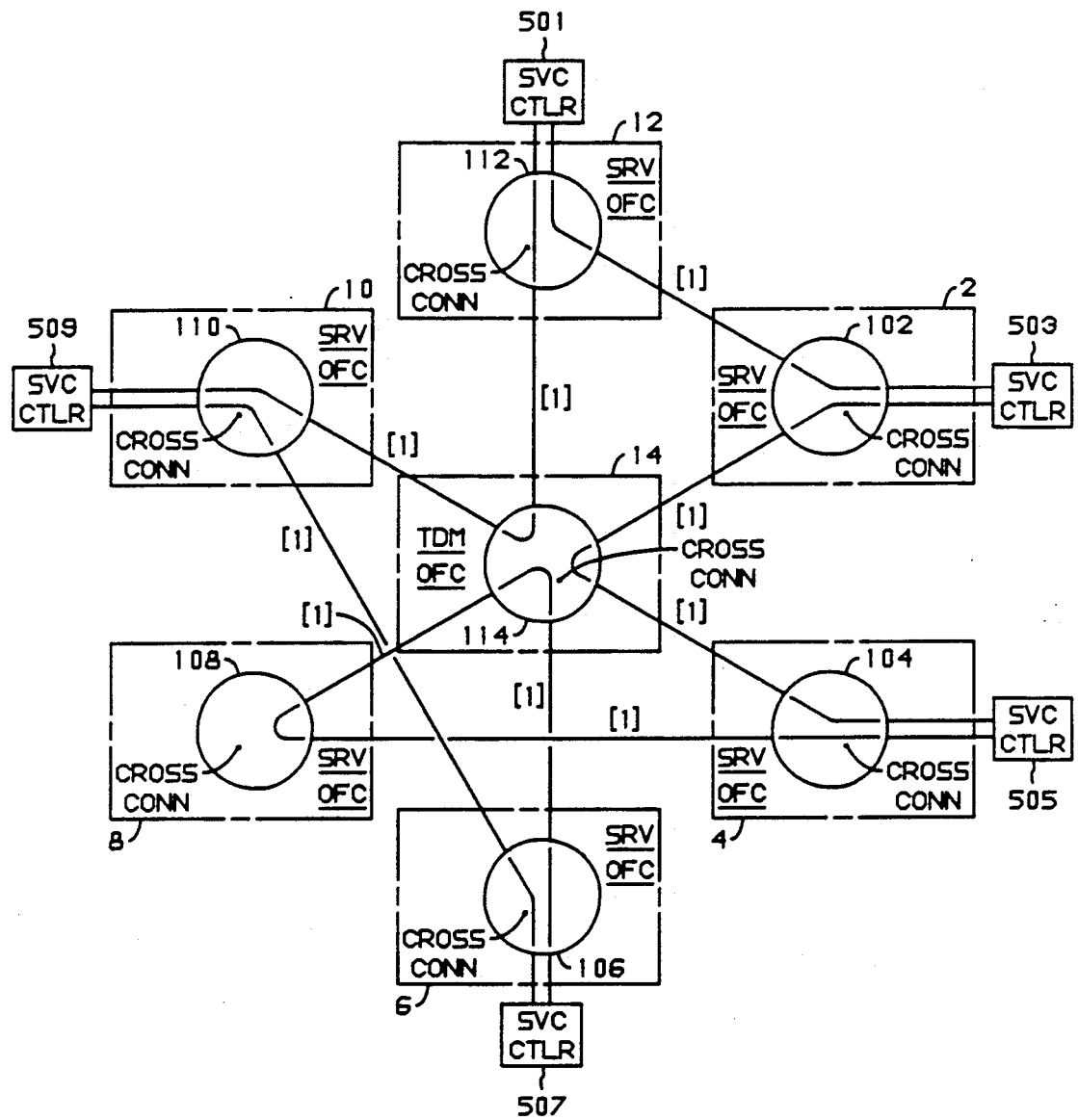
Figure 13:
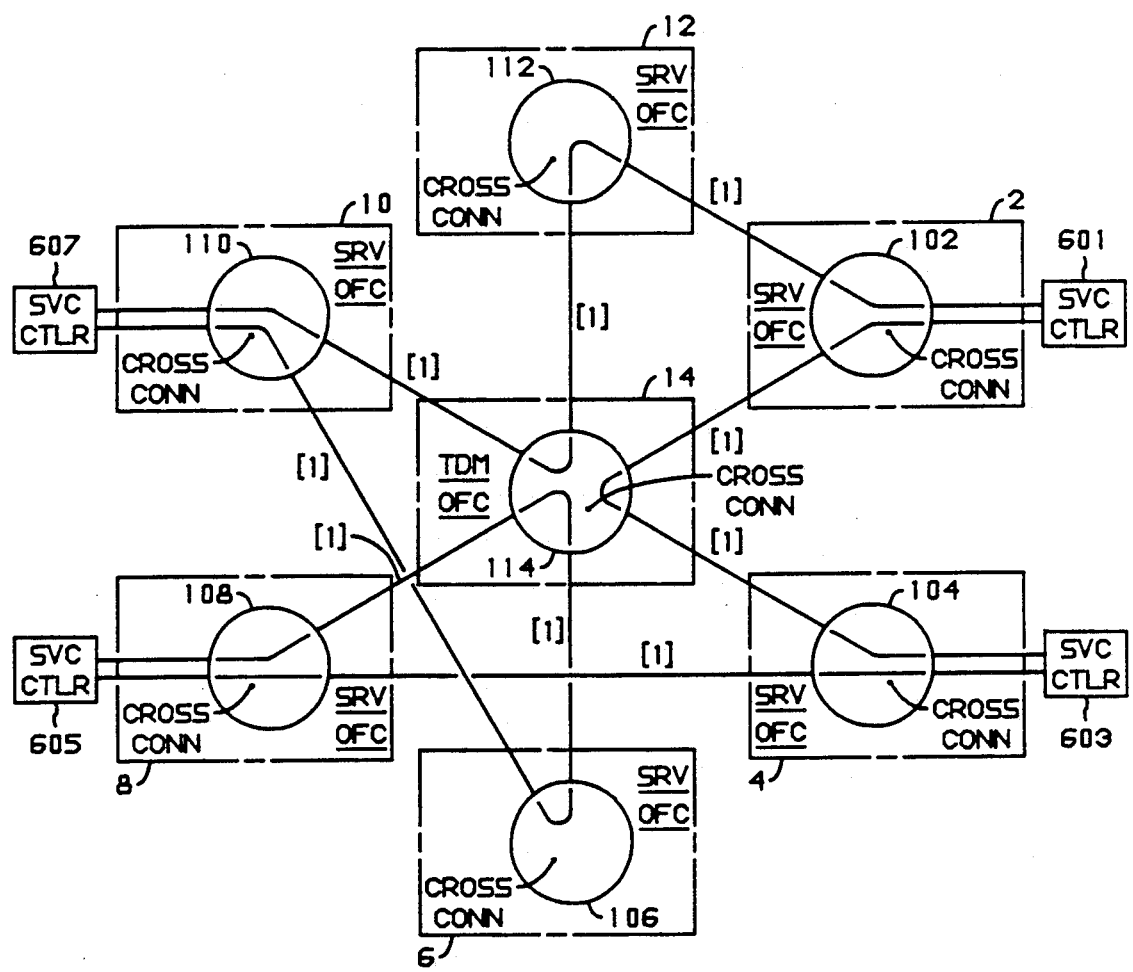
Figure 14:
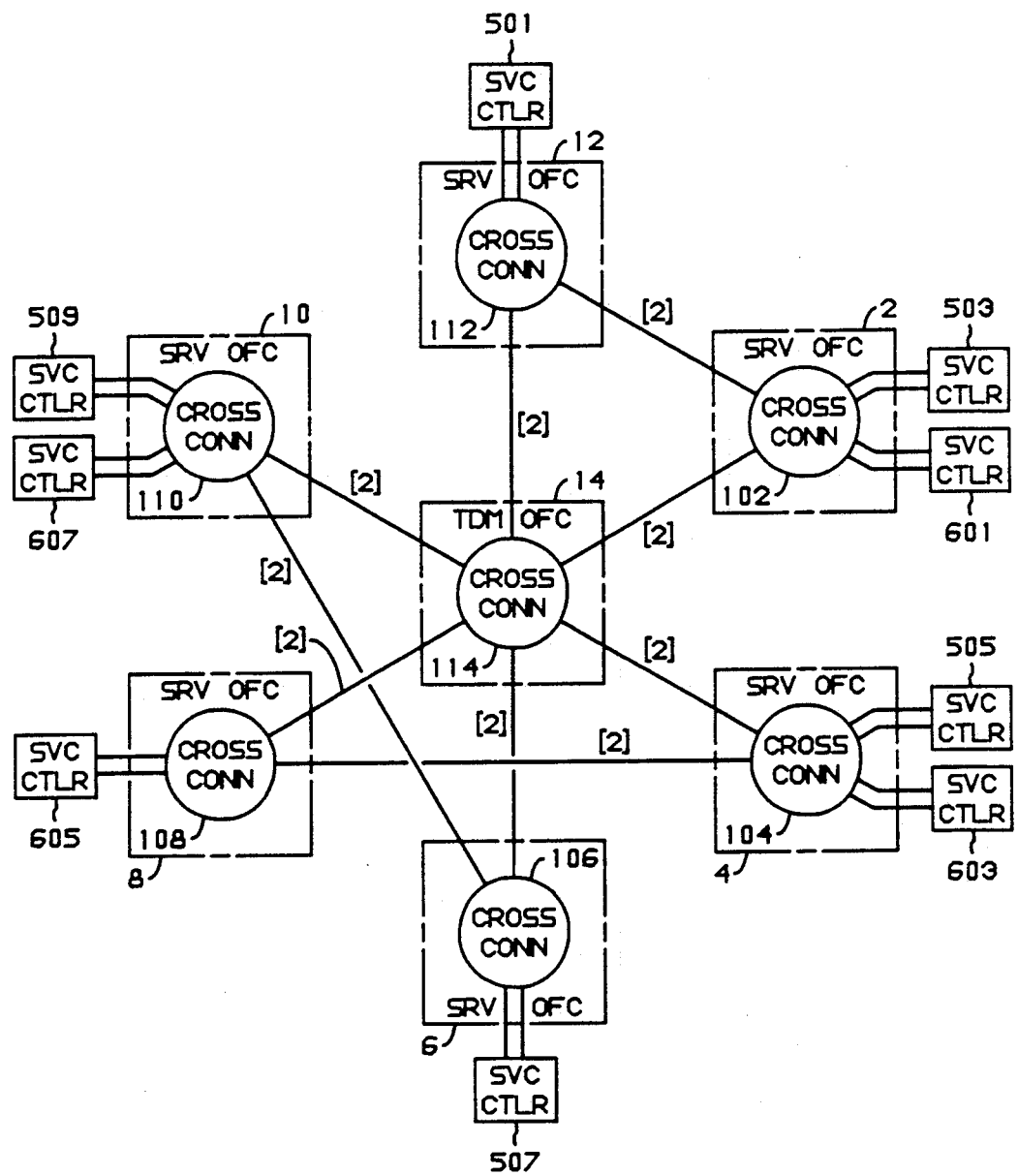

FIGS. 12–14 illustrate the configuration required to achieve a reliable dedicated network. A reliable network is defined for the purposes of these figures as a network which will survive the loss of any one link. FIG. 12 shows that a reliable network for serving customer A can be implemented using nine links. The links interconnecting switches 12, 2; 2, 14, and 14, 4; 6, 14, and 14, 8, and 8, 4; 6, 10; and 10, 14 and 14, 12. The same set of links differently configured as shown in FIG. 13 can provide customer B with a reliable dedicated network. The links include one connecting switches 2, 12 and 12, 14 and 14, 10; 2, 14 and 14, 4; 4, 8; 8, 14 and 6 and 6, 10. Notice that in both of these cases, several double and triple route links are required to join two serving offices. This is a consequence of the desire to avoid using the same route for redundant links. FIG. 14 is then simply a superposition of the links of FIGS. 12 and 13 and requires a total of eighteen links.

Figure 15:
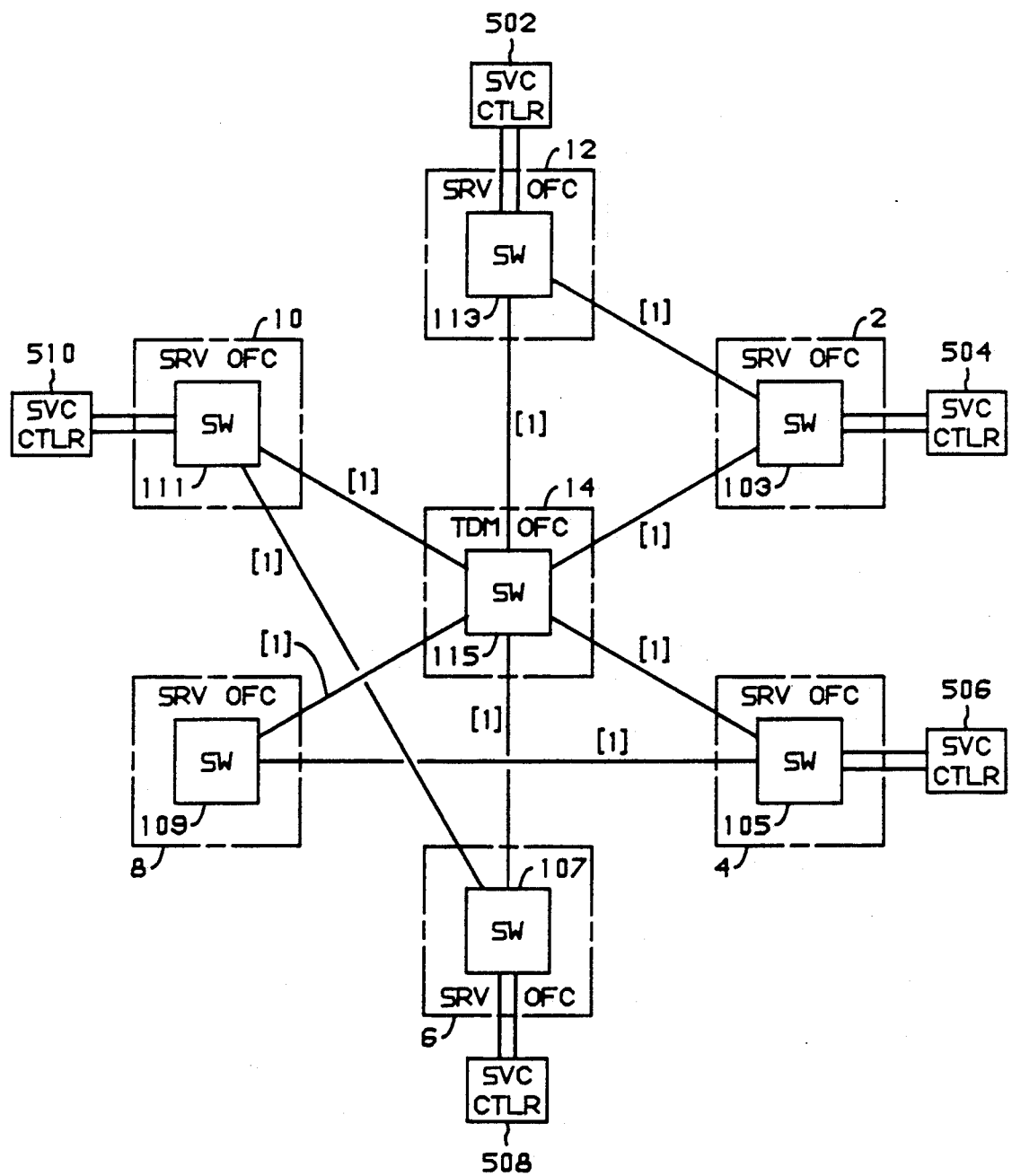
Figure 16:
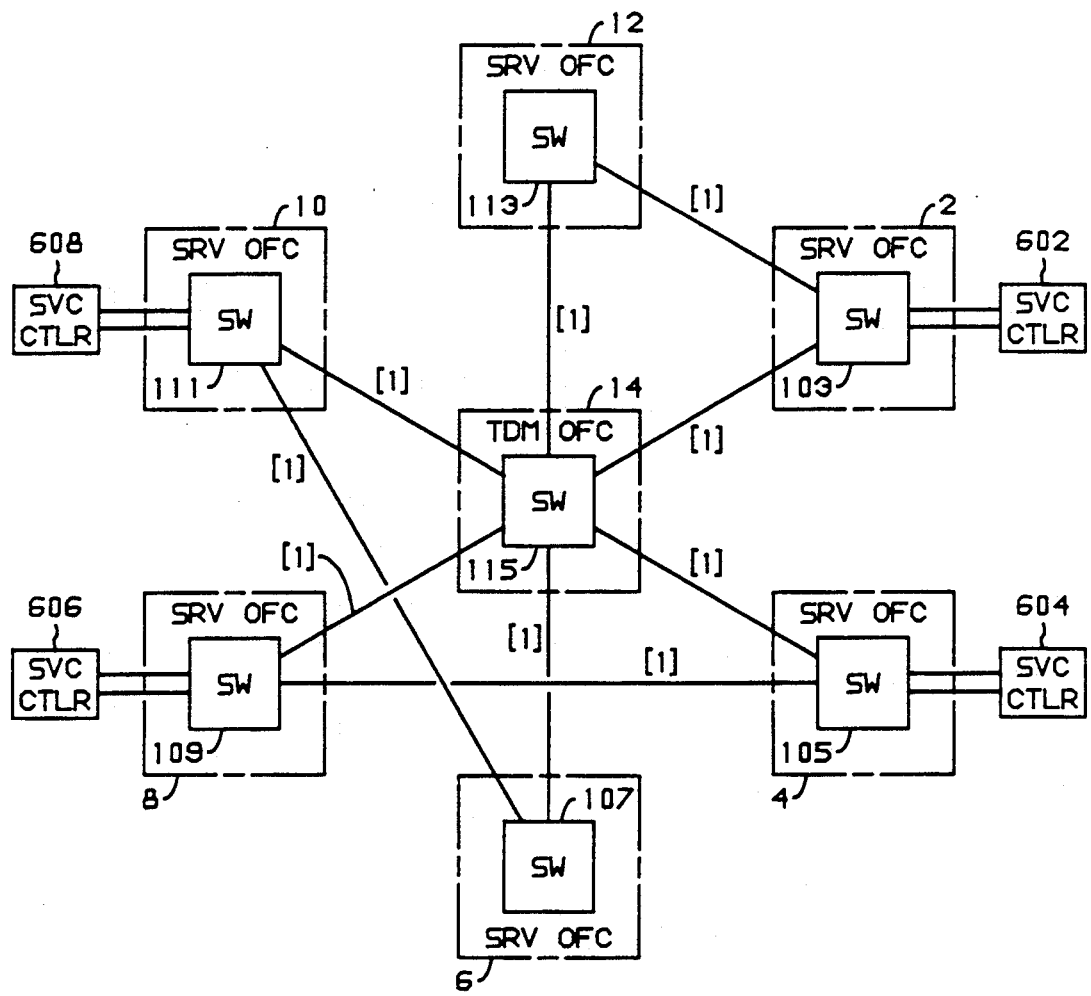
Figure 17:
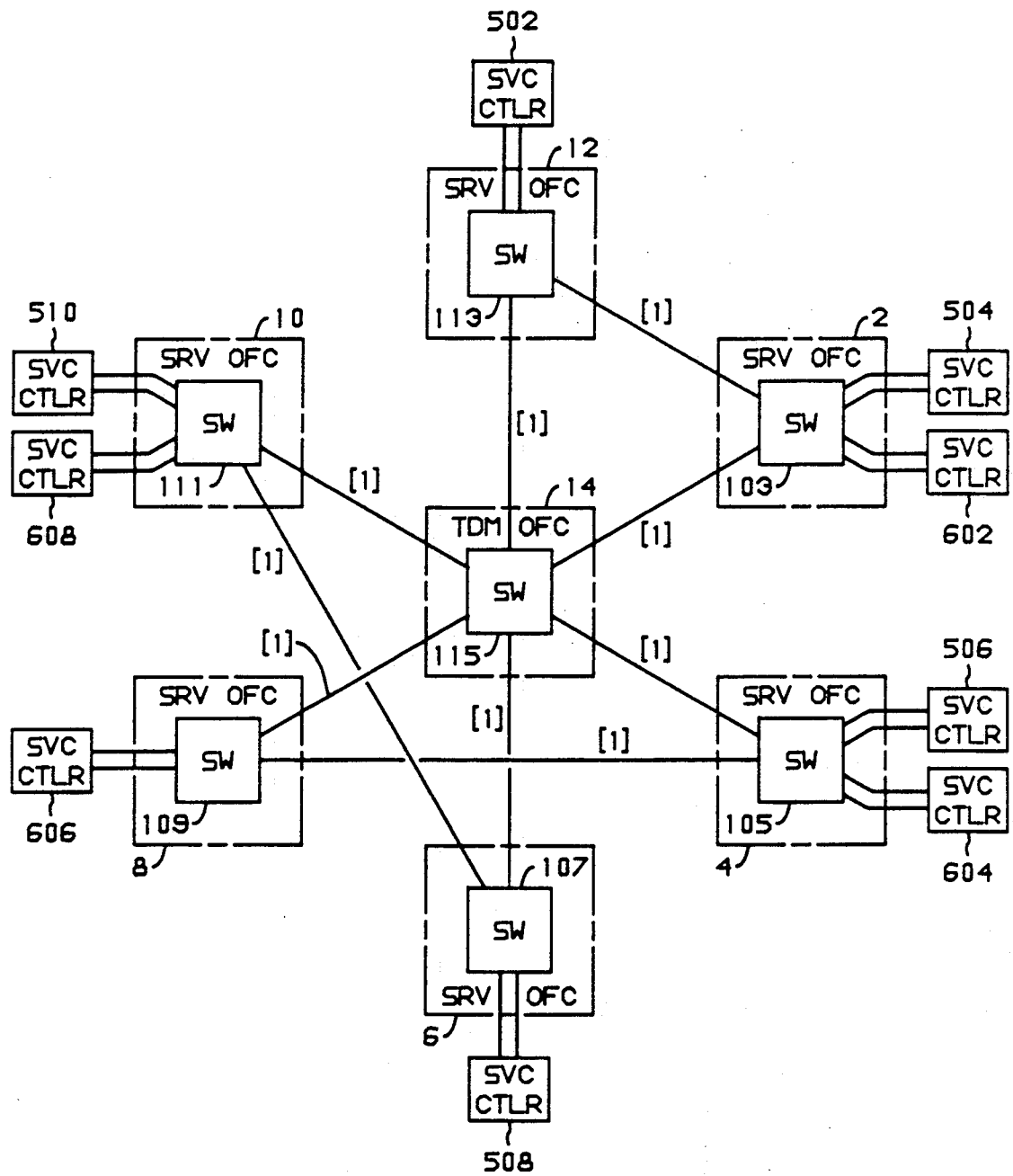

FIGS. 15–17 demonstrate that this number can be halved by using a shared network approach. FIG. 15 illustrates that the links needed for reliable interconnection of terminations 502, 504, 506, 508, and 510 of customer A's network is nine links, the same nine links as indicated in FIG. 12. Similarly, (FIG. 16) nine links are required to provide customer B with a reliable shared network. However, to provide both customers A and B with a reliable shared network, requires the same nine links, (FIG. 17) thus, halving the total number of links required for a reliable network using unshared facilities without switching.

In these examples, FIGS. 6 and 9 illustrate the advantage of a shared network in eliminating back haul, i.e., the process of going through a number of serving offices in order to connect adjacent serving offices. FIGS. 9–11 illustrate the sharing of channels on a facility to reduce the total number of links required. FIGS. 7 and 10 illustrate the advantages of use of switching to respond to shifts in demand. Finally, FIGS. 12 through 17 illustrate how redundancy can be obtained at lower cost in a shared switchable network. FIG. 14 illustrates that eighteen links ar required to achieve a reliable dedicated network, whereas, FIG. 17 shows that only nine links are required if the network can be shared. Finally, FIG. 17 shows a redundant and geographically diverse network wherein traffic over a facility containing any cable break can be routed over another facility.

Figure 18:
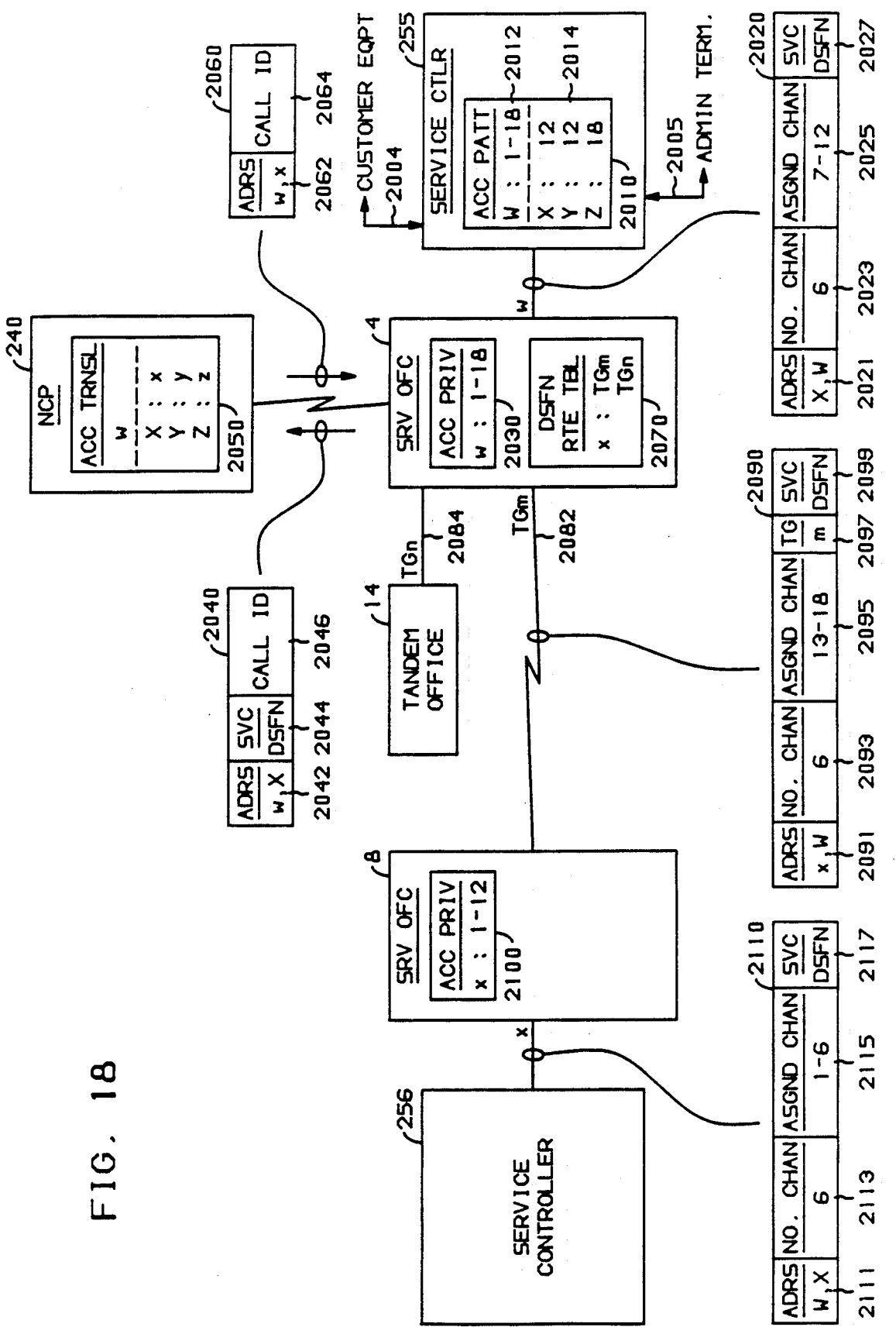
FIG. 18 illustrate the process of setting up a connection for a private network.

FIG. 18 illustrates the procedures and network data necessary for the service controller to establish a connection, and the means by which the network switching elements are able to control demand and route requested connections. The customer network administrator at terminal 260 (FIG. 2) is assigned by the carrier network administrator access channel numbers and dialable addresses (directory numbers) for each of the endpoints subscribed to the network. These data are entered into the service controllers by the customer administrator and into the network switch and Network Control Point by the network administrator. Further the network administrator assigns a network address for each endpoint as well as a set of address translations which convert dialable addresses to network addresses. The latter translations which are customer specific are placed in the Network Control Point and associated with each network address. Translations are provided only for allowed calls. Each of the serving offices comprises a switching network for establishing connections.

Figure 20:
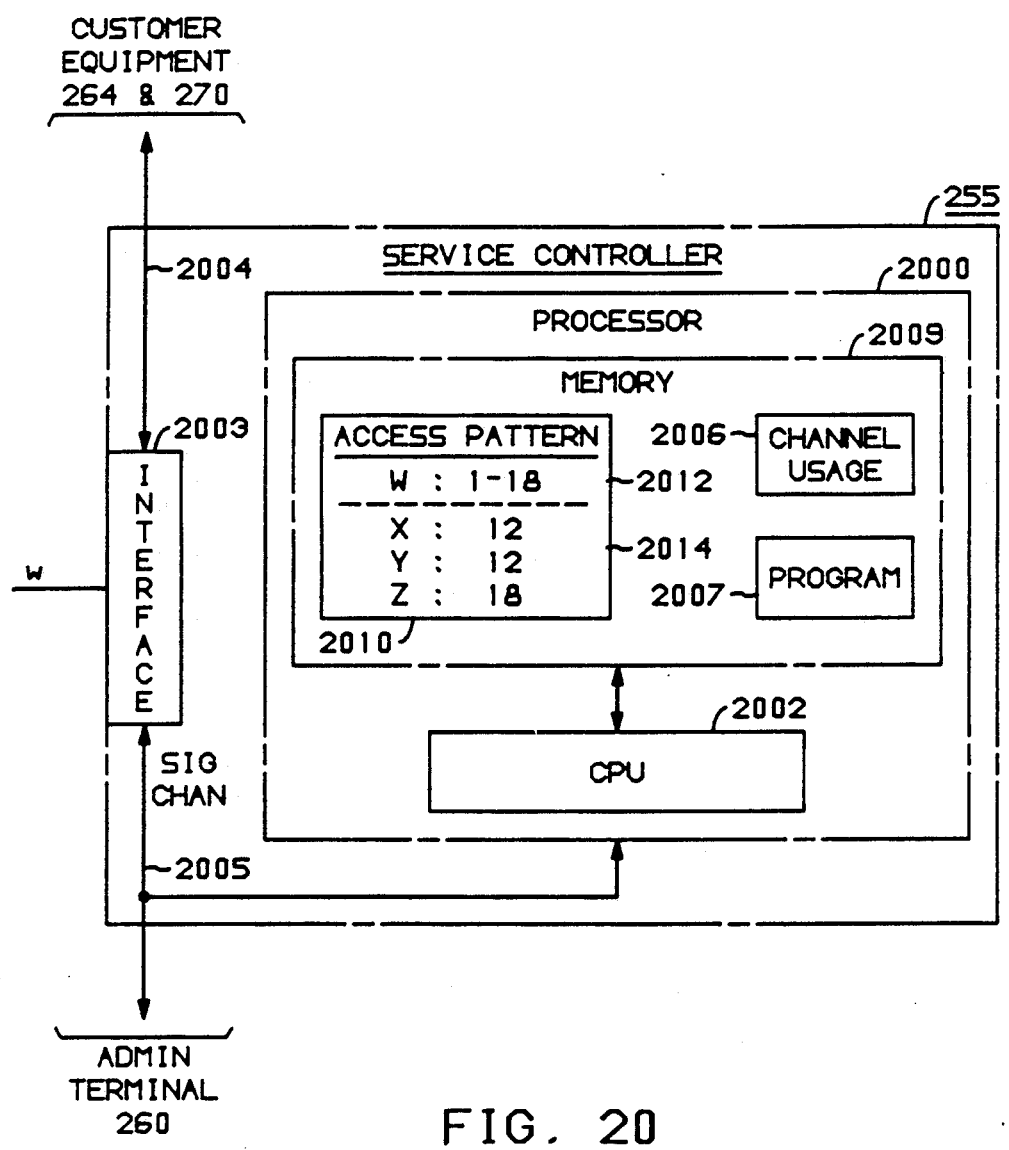
FIG. 20 is a block diagram of a customer's service controller.

Service controller 255, shown in detail in FIG. 20, comprises an interface 2003 for interfacing with the access channels to serving office 4. The interface is a PRI interface with one signaling channel 2005 for communicating with a customer administrative terminal 260 and a processor 2000 for controlling the service controller. The processor 2000 comprises a central processing unit 2002, a memory 2009 including table 2010 for storing access patterns of the service controller, table 2006 for storing channel usage data, and a program 2007. The processor 2000 communicates with serving office 4 via the signaling channel 2005. The output of the interface is also connected via channels 2004 to the customer equipment 264, 270.

A call is illustrated between dialable addresses W on serving office 4, and X on serving office 8, both W and X are dialable addresses of customer B. (Dialable addresses are upper case letters W, X. Y, Z; network (physical) addresses are lower case letters w, x, y, z.) The service controller 255 upon command from the customer administrator's terminal 260, checks in Table 2010 to see how many channels can be accessed for the various allowable outgoing addresses X, Y, and Z. Segment 2014 indicates that 12 channels are allowed for X, 12 for Y, and 18 for Z. Segment 2010 indicates that the total number of channels allowed at any one time is 18, identifies these as 1–18, and identifies the directory number, W, of the source. Service controller 255 initiates a call to X by sending a setup message 2020 over the primary rate interface (PRI) containing the following information elements; dialable addresses X and W (2021), number of channels (6) (2023), assigned channels &-12) (2025) and the type of service (DSFN) (2027) for which the connection will be established. The serving office 4 interprets the service type and network address in order to check a table 2010 of allowed access channels. If the requested channels are correct and adequate for the desired call, the serving office 4 formulates a Common Channel Signaling (CCS) message (2040) containing the network address w of the originating access line and dialable address X, (segment 2041, service type (segment 2044), and a call ID (segment 2046). This message is transmitted to the Network Control Point (NCP) 240. The network address along with the service type determines the message routing to the correct NCP and customer data record in the NCP. If the number or type of access channels is not correct, or is inadequate, the call is blocked by the switch by signaling a call denial message to the source controller.

The Network Control Point 240 uses the received information to verify that the customer has subscribed to the desired service, and to access a table 2050 containing the network address translations, i.e., translations from the dialable address to the network address, for allowed network addresses for calls originating from network address w. The network address is a concatenation of the terminating switch address and the terminating address of the access line at that switch. If the desired dialable address, X, is an allowed translation for w, then a return message 2060 containing the call ID 2064 and the routing translation (2062) comprising the network addresses w, x, of the two endpoints is sent to the originating service office. If not, a call denial message is sent to the serving office which in turn blocks the call. The details of the call denial are returned to the customer administrator and provide useful trouble shooting information.

In the case of an allowed call, the data at the serving office associated with the call ID and the translated routing number are used to proceed with the routing of the call. Service type, network address and bandwidth data are used to point to a routing table 2070 within the serving office 4 which contains a list in preferred order of the outgoing facilities which can transport the call to its destination. Only the terminating switch address portion of the network address is needed to determine routing. These facilities are dedicated to the service and engineered to give a very low level of block given the known demand and statistical failure rate of facilities. The set of outgoing facilities traverse at least two physically diverse paths. The preferred routes are searched in order until an idle set of channels is found. In this case, the two routes, in order of preference, are trunk group M (2082), a direct route to destination serving office 8, and trunk group n (2084), a route that goes via tandem serving office 14. Assume that a trunk of trunk group m is available. A table (not shown) of trunks of trunk group m is searched to find an available set of channels for the connection.

Subsequent serving offices in the network, based on incoming trunk type and Common Channel Signaling data in the form of call type and terminating network address will further route the call to the desired terminating switch. At any point where the call cannot be further routed due to lack of facilities, the call will be terminated. Routing schemes such as Dynamic Non-Hierarchical Routing which allows the call to be automatically reattempted at the originating switch until all possibilities are exhausted can also be employed.

In this case, with the direct route available, serving office 4 sends a CCS message 2090, comprising segments 2091 (x, network address of the destination, W, dialable address of the source), 2093 (6, the number of channels for this call), 2095 (13–18, the channels of the trunk group, assumed in this case to be a single 24 channel group, that have been assigned to this call) 2097 (m, the identity of the trunk group) and 2099 (DSFN, the type of service for this call). When message 2090 is received in serving office 8, the access privilege for network address x are checked in table 2100, and it is found that the service controller 256 has been assigned to channels 1–12 on the access facility. Serving office 8 sends a message 2110 to service controller 256 to establish the requested connections. Message 2110 comprises segments 211 (dialable addresses X, W of source and destination), 2113 (6, the number of channels of the connection), 2115 (1–6, the channels assigned to the connection) and 2117 (DSFN, the type of service). Upon positive acknowledgment, the call is completed and a connect message is transmitted to the originating service office 4 and service controller 255. If the appropriate channels are inadequate in number or non-existent the call is blocked. During the progress of the call, messages relating the status of the call are sent to service controller 255. If the call is blocked, an abnormal event, a code in the denial message to service controller 255 will indicate the cause of blocking. This information would be displayed at the customer administrator's terminal 260 by the service controller 255.

Once established, a connection is held indefinitely. Serve noise or failure of the network facilities can cause the serving offices 4 or 8 or the service controller 255 or 256 to disconnect. Under these condition, the service controller 255 or 256 would automatically reestablish the connection as described above. A serving office will take very noisy or failed trunks out of service, for example, trunk group m. When the call is reestablished, since the old route is unavailable, a new route will be selected by the serving office, in this case, trunk group n. The engineering of the network facilities assures that there will be a physically diverse facility with adequate capacity to carry the redirected connection.

Figure 19:
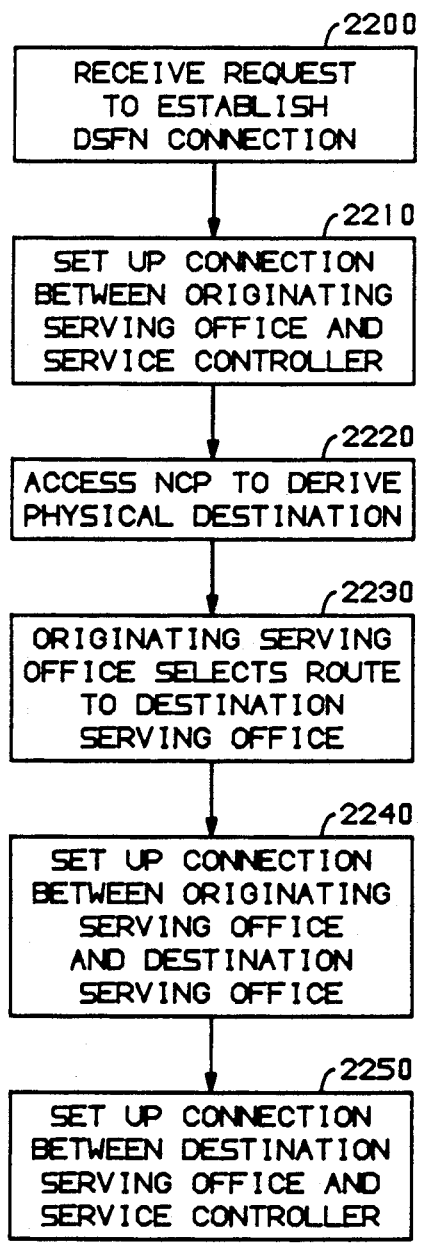
FIG. 19 is a flow chart illustrating the steps of setting up such a connection.

FIG. 19 is a flow diagram of the functions performed as described in FIG. 18. First, a serving office receives a request to establish a DSFN connection (action block 2200). A connection is then set up between the originating serving office and the service controller from which the request was received (action block 2210). An NCP (in this case NCP 240) is then accessed to derive the physical address of the destination from the directory number of that destination (action block 2220). The originating serving process then selects a route based on the identity of the destination serving office (action block 2230). Finally, a connection is set up between the originating serving office and the destination serving office and between the destination serving office and the serving office controller at that destination (action block 2240).

For purposes of rearranging the customer network to meet changed demand, the customer administrator may disconnect existing connections and establish new connections of different bandwidths to the set of predefined locations identified in the Network Control Point. The only constraint is that the total bandwidth between two endpoints cannot exceed the bandwidth of the access channels assigned tot he service. If the customer administrator desires additional bandwidth or new locations, a service order to the network administrator is necessary. If adequate network capacity exists without adding new facilities, the network administrator may grant service by updating the appropriate tables in the switch and Network Control Point. This ability to do this allows the potential of granting service in a significantly short interval than that required to provision a customer dedicated facility which must be manually routed.

The use of the Network Control Point (database processing system) for translating addresses allows more sophisticated features to be associated with call routing. The ability t form closed calling groups has already been described. Additional features include: translations which vary by time of day and date, subscriber activated translations changes, and centralized monitoring of connection patterns. These features could be implemented at the service controller but would be more difficult to administer and control in those devices.

It is to be understood that the above description is only of one preferred embodiment of the invention. Numerous other arrangements may be devised by one skilled in the art without departing from the spirit and scope of the invention. The invention is thus limited only as defined in the accompanying claims.

I claim:

1. In a communications network comprising a plurality of serving offices and a plurality of transmission facilities for interconnecting ones of said serving offices, each facility comprising t lest one communication channel, a method of interconnecting access links connecting said network to a private network customer for providing private service, comprising the steps of:

responsive to a request message from said private network customer specifying communication capacity requirements and comprising data for identifying first access link and second access links to be connected, selecting channels from a pool of channels of said transmission facilities, said pool dedicated to providing private network service to a plurality of private network customers, identities of channels of said pool being stored in data tables of said network, for providing a number of channels between said first and second access links of said customer meeting said capacity requirements; and connecting said first and second access links via said selected channels via a switched connection through ones of said plurality of serving offices.

2. The method of claim 1 further comprising the steps of:

detecting a failure in at lest one of said channels used for interconnecting said first and second access link of said customer, selecting at lest one alternate available channel from said pool of dedicated channels; and connecting said first and second access links of said customer via said at lest one alternate available channel via a switched connection through ones of said plurality of serving offices.

3. The method of claim 1, wherein said facilities comprise carrier groups each comprising a set of channels, and wherein said selecting step comprises the step of:

selecting a proper subset of the set of channels of one of said carrier group for meeting transmission requirements of said private customer between said first and second access links.

4. The method of claim 1 further comprising the step of:

communicating over at least one of said first and second access links by integrated communication and signaling channels.

5. The method of claim 1, wherein said communications network further comprises data tables for storing first data identifying the number, identity, and availability of access channels on access links of said customer, and wherein said selecting step comprises the step of:

responsive to said request, checking said request against said first data identifying the number and availability of access channels on said first and second access links.

6. The method of claim 5 further comprising the step of notifying said private customer if insufficient access channels are available on at least one of said first and second access links to meet said request.

7. The method of claim 5 further comprising the step of:

responsive to said connecting step, updating said first data to indicate that said requested number of channels on said first and second access links are unavailable.

8. The method of claim 5 further comprising the step of:

responsive to a request from a network administrator, altering said first data for identifying the number and identity of access channels on said first and second access links.

9. The method of claim 1 wherein said communications network is a common carrier network further comprising the step of:

responsive to a request from a network administrator, adding or subtracting channels to or from said pool by altering said data tables for storing identities of channels of said pool dedicated to providing private network service; and making any channels added or to a subtracted from said pool unavailable or available, respectively, or use for public service in said common carrier network.

10. The method of claim 1 wherein said communications network is a common carrier network and wherein said connecting step comprises:

connecting said first and second access links over said channels selected for said customer via a switched connection through ones of said plurality of serving offices, and wherein said ones of said plurality of serving offices comprise serving offices for also switching public telecommunications traffic.

11. The method of claim 1 further comprising the step of:

engineering said pool to meet peak demands of a plurality of private customers, said peak demands being limited by pluralities of access links provided to each of said plurality of private customers and the number of access channels provided on each of said pluralities of access links.

12. The method of claim 11 wherein said engineering step comprises:

engineering said pool to meet said peak demands augmented by adequate additional capacity to allow for restoral of channels to private customers in the event of failure of any transmission facility interconnecting ones of said plurality of serving offices.

13. The method of claim 12 wherein said engineering comprises:

engineering said pool to provide a sufficient number of channels on physically diverse facilities so that alternate channels can be provided if all facilities of one physical route fail.

14. The method of claim 11, wherein said communications network is a common carrier network, wherein said facilities comprise carrie groups each comprising set of channels, and wherein said engineering step comprises:

engineering said pool according to rules such that said pool may comprise a proper subset of channels of a carrier group between two of said serving offices.

15. The method of claim 1 further comprising the step of:

transmitting said request from a customer administrator terminal to one of said serving offices.

16. The method of claim 15 wherein said transmitting step comprises the step of:

transmitting said request over an integrated communication and signaling facility of an access link connecting said private network customer to said communications network.

17. The method of claim 1 wherein said selecting step comprises the step of:

transmitting from one of said serving offices a message, comprising said data for identifying said first and second access links, from said request, to a data base and receiving a message in said serving office from said data base comprising data identifying at least one of said first and second access links.

18. The method of claim 17 further comprising the step of:

translating said data identifying at least one of said first and second access links to find a route from said one of said serving offices to a serving office connected to one of said first and second links.

19. The method of claim 1 further comprising the step of:

sending a message over a common channel signaling system to a serving office connected to one of said channels of said route for establishing part of said connection between said first and second access links of said customer.

20. The method of claim 17 further comprising the step of:

in said data base, translating from said data for identifying said first and second access links to said identifying at lest one of said first and second access links.

21. The method of claim 20 wherein said data for identifying said first and second access links comprises at least one dialable number, and said data identifying at least one of said first and second access links comprises data identifying at least one serving office and a physical access channel of said at least one serving office.

22. The method of claim 1 further comprising the steps of:

storing availability data for each of said channels of said pool in said data tables;

responsive to another request from said private network customer, specifying a number of channels to be disconnected between identified access links;

disconnecting said specified number of channels; and making said disconnected channels available, in said availability data of said data tables, for serving other of said plurality of private network customers.

23. The method of claim 1 wherein said selecting step comprises the steps of:

receiving at a first serving office said request wherein said information for identifying said access links comprises a dialable address of said second access link;

translating said dialable address of said access link to a physical address, said physical address comprising an identification of a second serving office connected to said second access link;

selecting at said firs serving office a trunk group for connection to said second serving office; and selecting a channel of said trunk group from members of said pool of channels available in said first serving office.

24. The method of claim 23 wherein said connecting step comprises the steps of:

setting up a first connection in said first serving office between said first access link and said selected channel; and transmitting a message to a serving office connected to said selected channel for extending said connection to said serving office connected to said selected channel.

25. The method of claim 1 wherein ones of said channels of said pool are identified in data tables of serving offices connected to said ones of said channels.

26. The method of claim 1 wherein said connecting step comprises:

selecting a preferred trunk group comprising channels from said pool;

testing whether channels from said pool are available in said preferred trunk group; and if no channels from said pool are available in said preferred trunk group, selecting an alternate trunk group comprising channels from said pool.

27. The method of claim 26 wherein said alternate trunk group uses different facilities than the facilities of said preferred trunk group.

28. A customer service controller for interfacing between customer equipment and a telecommunications network, comprising a plurality of intra-network communications channels, comprising:
   means for interfacing access communications channels and signaling channels connected to said network and to said customer equipment;
   means for detecting a failure of an inter-network communications channel of said network; and
   means responsive to said detecting for sending a request message from said controller to said network over one of said signaling channels for selecting an alternate intra-network communications channel, from a plurality of intra-network communications channels available to a plurality of customers, and establishing a connection between said customer equipment and said alternate channel.

29. A customer service controller for interfacing between customer equipment and a telecommunications network comprising:
   means for interfacing access communications channels and signaling channels to said network and to said customer equipment;
   means for detecting a failure of a communications channel of said network connected to said customer equipment;
   means responsive to said detecting for sending a request message from said controller to said network over one of said signaling channels for selecting an alternate communications channel and establishing a connecting between said customer equipment and said alternate channel; and
   means for maintaining the identity of allowable destinations, an allowable number of channels to each of said destinations, and present usage of said access communications channels.

30. A customer service controller for interfacing between customer equipment and a telecommunications network comprising:
   means for interfacing access communications channels and signaling channels to said network and to said customer equipment comprising at least one primary rate interface of an integrated services digital network;
   means for detecting a failure of a communications channel of said network connected to said customer equipment; and
   means responsive to said detecting for sending a request message from said controller to said network over one of said signaling channels for selecting an alternate communications channel and establishing a connection between said customer equipment and said alternate channel.

31. A customer service controller for interfacing between customer equipment and a telecommunications network comprising:
   means for interfacing access communications channels and signaling channels to said network and to said customer equipment;
   means for detecting a failure of a communications channel of said network connected to said customer equipment;
   means responsive to said detecting for sending a request message from said controller to said network over one of said signaling channels for selecting an alternate communications channel and establishing a connection between said customer equipment and said alternate channel; and
   means responsive to said detection for reporting said failure to an administrative terminal of said customer equipment.

32. In a communications network comprising a plurality of serving offices and a plurality of transmission facilities for interconnecting said serving offices, each facility comprising at least one communication channel, apparatus for providing private service interconnections between first access links and second access links connecting said network to a private network customer, said first access links connected to a first one of said serving offices, comprising:
   a pool of communications channels of said facilities for interconnecting said first serving office to others of said serving offices;
   said first serving office operative under the control of a program for establishing connections in said first serving office for extending connections from ones of said first access links toward ones of said second access links via ones of said pool communication channels in response to receipt of a request from said private network customer comprising data for identifying said second access links.

33. In the communications network of claim 32, the apparatus further comprising:
   said first serving office further operative under the control of a program and responsive to a failure in one of said ones of said pool of communications channels for selecting at least one alternate available channel from said pool of dedicated channels and extending connections from said ones of said first access links via said at lest one alternate available channel toward said ones of said second access links.

34. The communications network of claim 32 wherein said apparatus further comprises:
   a data base system, accessible from said first serving office, for storing data for identifying the physical locations of access links of said private customer.

35. In the communications network of claim 32, the apparatus further comprising:
   common channel signaling facilities interconnecting said first serving office to others of said plurality of serving offices for transmitting signaling messages for establishing connections in said others of said serving offices.

36. In a common carrier communications network comprising a plurality of serving offices and a plurality of transmission facilities for interconnecting ones of said serving offices, each facility comprising at least one carrier group, each carrier group comprising a set of channels, a method of interconnecting access links connecting said network to a private network customer for providing private service comprising the steps of:
   responsive to a request received from a customer administrator terminal of said private network customer, said request specifying a number of channels and comprising data for identifying first and second access links to be connected by said number of channels, selecting channels from a pool of channels, dedicated to providing private network service, whose identities are stored in data tables of said network, for providing said number of channels between said first and said second access links of said customer;

connecting said first and second access links via said channels selected for said customer via a switched connection through ones of said plurality of serving offices;

updating first data to indicate that said requested number of channels on said first and second access links are unavailable;

detecting a failure in at least one of said channels used for interconnecting said first and second access links of said customer, selecting at least one alternate available channel from said pool of dedicated channels;

connecting said first and secton access links of said customer via said at least one alternate available channel via a switched connection through ones of said plurality of serving offices;

communicating over at least one of said first and second access links by integrated communication and signaling channels;

responsive to a request from a network administrator, adding or subtracting channels to or from said pool by altering said data tables for storing identities of channels of said pool dedicated to providing private network service;

making any channels added to or subtracted from said pool unavailable or available, respectively, for use for public service in said common carrier network;

wherein said communications network comprises data tables for storing first data identifying the number, identity, and availability of access channels on access links of said customer;

wherein said step of selecting channels from said pool comprises the steps of:

receiving at a first serving office said request wherein said information for identifying said access comprises a dialable address of said second access link;

checking said request against said first data identifying the number and availability of access channels on said first and second access links;

notifying said private customer if insufficient access channels are available on at least one of said first and second access links to meet said request;

in a data base of said network, translating said dialable address of said second access link to a physical address, said physical address comprising an identification of a second serving office connected to said second access link;

selecting at said first serving office, a route to said second serving office;

selecting a channel of said route from members of said pool of channels available in said first serving office; and sending a message over a common channel signaling system to a serving office connected to one of said channels of said route for establishing part of said connection between said identified first and second access links of said customers.

* * * * *

UNITED STATES PATENT AND TRADEMARK OFFICE
CERTIFICATE OF CORRECTION

PATENT NO. : 4,993,014

DATED : February 12, 1991

INVENTOR(S) : Travis H. Gordon

It is certified that error appears in the above-identified patent and that said Letters Patent is hereby corrected as shown below:

Claim 1, column 13, line 65, delete "t lest" and substitute --at least--.

Claim 2, column 14, line 18, delete "lest" and substitute --least--.

Claim 2, column 14, line 19, delete "link" and substitute --links--.

Claim 2, column 14, line 21, delete "lest" and substitute --least--.

Claim 2, column 14, line 24, delete "lest" and substitute --least--.

Claim 9, column 15, line 4, delete "or to a" and substitute --to or--.

Claim 9, column 15, line 5, delete "or" and substitute --for--.

Claim 14, column 15, line 42, delete "carrie" and substitute --carrier--.

Claim 20, column 16, line 16, delete "lest" and substitute --least--.

Claim 23, column 16, line 42, before "access" insert --second--.

Claim 23, column 16, line 46, delete "firs" and substitute --first--.

Claim 29, column 17, line 37, delete "connecting" and substitute --connection--.

Claim 32, column 18, line 26, after "pool" delete "communication" and substitute --of communications--.

Claim 33, column 18, line 38, delete "lest" and substitute --least--.

Claim 36, column 19, line 17, delete "secton" and substitute --second--.

UNITED STATES PATENT AND TRADEMARK OFFICE
CERTIFICATE OF CORRECTION

PATENT NO. : 4,993,014

DATED : February 12, 1991

INVENTOR(S) : Travis H. Gordon

It is certified that error appears in the above-identified patent and that said Letters Patent is hereby corrected as shown below:

Claim 36, column 20, line 8, after "access" insert --links--.

Signed and Sealed this

Twenty-ninth Day of September, 1992

Attest:

DOUGLAS B. COMER

*Attesting Officer*  *Acting Commissioner of Patents and Trademarks*